US012720359B2

(12) United States Patent
Kanamarlapudi et al.

(10) Patent No.: US 12,720,359 B2
(45) Date of Patent: Aug. 25, 2026

(54) COMMUNICATING PROTOCOL DATA UNIT SET TRAFFIC INFORMATION

(71) Applicant: QUALCOMM Incorporated, San Diego, CA (US)

(72) Inventors: Sitaramanjaneyulu Kanamarlapudi, San Diego, CA (US); Sebastian Speicher, Wallisellen (CH); Linhai He, San Diego, CA (US); Prashanth Haridas Hande, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 383 days.

(21) Appl. No.: 18/477,333

(22) Filed: Sep. 28, 2023

(65) Prior Publication Data

US 2025/0113241 A1 Apr. 3, 2025

(51) Int. Cl.
*H04W 28/02* (2009.01)
*H04W 36/00* (2009.01)

(52) U.S. Cl.
CPC ... *H04W 28/0263* (2013.01); *H04W 36/0016* (2013.01)

(58) Field of Classification Search
CPC ..... H04W 28/02; H04W 28/06; H04W 28/08; H04W 28/12; H04W 28/18; H04W 28/24; H04W 36/00; H04W 36/02; H04W 72/12; H04W 72/04; H04W 72/21; H04W 72/54; H04W 76/15; H04W 76/11; H04L 5/00; H04L 29/08; H04L 67/02; H04L 67/14; H04L 65/65; H04L 69/22
USPC .......................................................... 370/329
See application file for complete search history.

(56) References Cited

U.S. PATENT DOCUMENTS

| | | | | |
|---|---|---|---|---|
| 11,627,614 | B2 * | 4/2023 | Hori | H04W 76/27 370/329 |
| 12,328,737 | B2 * | 6/2025 | Lee | H04L 5/0053 |
| 2019/0349804 | A1 * | 11/2019 | Cho | H04W 28/0268 |
| 2024/0259454 | A1 * | 8/2024 | Kammachi Sreedhar | H04L 69/22 |
| 2024/0284253 | A1 * | 8/2024 | Kuo | H04L 47/32 |
| 2024/0334237 | A1 * | 10/2024 | Shrivastava | H04W 28/0268 |
| 2024/0334529 | A1 * | 10/2024 | Lee | H04W 8/22 |
| 2025/0024321 | A1 * | 1/2025 | Hong | H04W 28/06 |

(Continued)

OTHER PUBLICATIONS

Interdigital Inc: "KI #4 and KI#5, Solution #52 Update, Resolving ENs on Peer-to-peer Communication and Uplink QoS", SA WG2 Meeting #152e, S2-2205911, Aug. 22-Sep. 1, 2022, Electronic Meeting, vol. SA WG2, No. Online, Aug. 10, 2022, XP052184311, 6 Pages, The Whole Document.

(Continued)

*Primary Examiner* — Man U Phan
(74) *Attorney, Agent, or Firm* — Harrity & Harrity LLP

(57) ABSTRACT

Various aspects of the present disclosure generally relate to wireless communication. In some aspects, a user equipment (UE) may generate a signaling message that includes information associated with protocol data unit (PDU) set traffic, the PDU set traffic being associated with a PDU set that includes a plurality of PDUs associated with an application data unit, wherein the information associated with the PDU set traffic indicates at least one of a presence of the PDU set traffic, a start of the PDU set traffic, or an end of the PDU set traffic. The UE may transmit the signaling message via one or more network layers. Numerous other aspects are described.

30 Claims, 11 Drawing Sheets

(56) References Cited

U.S. PATENT DOCUMENTS

| | | | | |
|---|---|---|---|---|
| 2025/0024322 | A1* | 1/2025 | Hong | H04W 74/0833 |
| 2025/0063427 | A1* | 2/2025 | Sha | H04L 5/0053 |
| 2025/0106681 | A1* | 3/2025 | Ha | H04W 28/0268 |
| 2025/0133440 | A1* | 4/2025 | Fu | H04W 28/0268 |
| 2025/0212289 | A1* | 6/2025 | Hong | H04W 28/0263 |

OTHER PUBLICATIONS

International Search Report and Written Opinion—PCT/US2024/044775—ISA/EPO—Nov. 25, 2024.

Lenovo: "Discussion on UE Feedback Enhancements", 3GPP TSG-RAN WG2 Meeting #121 Meeting, R2-2300946, Athens, Feb. 27-Mar. 3, 2023, vol. Ran WG2, No. Athens, GR, Feb. 17, 2023, XP052245589, 6 Pages, The Whole Document.

Nokia, et al., "UE Capabilities for Rel-18 XR", 3GPP TSG-RAN WG2 Meeting #123, R2-2308340, Toulouse, France, Aug. 21-25, 2023, vol. RAN WG2, No. Toulouse, FR, Aug. 11, 2023, XP052444045, 6 Pages, The Whole Document.

* cited by examiner

Control plane protocol stack

UE 120: NAS, RRC, PDCP, RLC, MAC, PHY

NN 110: RRC, PDCP, RLC, MAC, PHY

AMF: NAS

400

600

900

COMMUNICATING PROTOCOL DATA UNIT SET TRAFFIC INFORMATION

FIELD OF THE DISCLOSURE

Aspects of the present disclosure generally relate to wireless communication and to techniques and apparatuses for communicating protocol data unit set traffic information.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more network nodes that support communication for wireless communication devices, such as a user equipment (UE) or multiple UEs. A UE may communicate with a network node via downlink communications and uplink communications. "Downlink" (or "DL") refers to a communication link from the network node to the UE, and "uplink" (or "UL") refers to a communication link from the UE to the network node. Some wireless networks may support device-to-device communication, such as via a local link (e.g., a sidelink (SL), a wireless local area network (WLAN) link, and/or a wireless personal area network (WPAN) link, among other examples).

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a user equipment (UE) includes generating a signaling message that includes information associated with protocol data unit (PDU) set traffic, the PDU set traffic being associated with a PDU set that includes a plurality of PDUs associated with an application data unit, wherein the information associated with the PDU set traffic indicates at least one of a presence of the PDU set traffic, a start of the PDU set traffic, or an end of the PDU set traffic; and transmitting the signaling message via one or more network layers.

In some aspects, a method of wireless communication performed by a UE includes detecting a PDU set traffic indicator associated with PDU set traffic, the PDU set traffic being associated with a PDU set that includes a plurality of PDUs associated with an application data unit; and transmitting PDU set traffic information in accordance with the PDU set traffic indicator.

In some aspects, a method of wireless communication performed by a network node includes receiving, via one or more network layers, a signaling message that includes information associated with PDU set traffic, the PDU set traffic being associated with a PDU set that includes a plurality of PDUs associated with an application data unit, wherein the information associated with the PDU set traffic indicates at least one of a presence of the PDU set traffic, a start of the PDU set traffic, or an end of the PDU set traffic; and processing the PDU set traffic in accordance with the signaling message.

In some aspects, a method of wireless communication performed by a network node includes receiving PDU set traffic information in accordance with a PDU set traffic indicator, the PDU set traffic being associated with a PDU set that includes a plurality of PDUs associated with an application data unit; and processing the PDU set traffic in accordance with the PDU set traffic information.

In some aspects, an apparatus for wireless communication at a UE includes one or more memories; and one or more processors, coupled to the one or more memories, configured to cause the UE to: generate a signaling message that includes information associated with PDU set traffic, the PDU set traffic being associated with a PDU set that includes a plurality of PDUs associated with an application data unit, wherein the information associated with the PDU set traffic indicates at least one of a presence of the PDU set traffic, a start of the PDU set traffic, or an end of the PDU set traffic; and transmit the signaling message via one or more network layers.

In some aspects, an apparatus for wireless communication at a UE includes one or more memories; and one or more processors, coupled to the one or more memories, configured to cause the UE to: detect a PDU set traffic indicator associated with PDU set traffic, the PDU set traffic being associated with a PDU set that includes a plurality of PDUs associated with an application data unit; and transmit PDU set traffic information in accordance with the PDU set traffic indicator.

In some aspects, an apparatus for wireless communication at a network node includes one or more memories; and one or more processors, coupled to the one or more memories, configured to cause the network node to: receive, via one or more network layers, a signaling message that includes information associated with PDU set traffic, the PDU set traffic being associated with a PDU set that includes a plurality of PDUs associated with an application data unit, wherein the information associated with the PDU set traffic indicates at least one of a presence of the PDU set traffic, a start of the PDU set traffic, or an end of the PDU set traffic; and process the PDU set traffic in accordance with the signaling message.

In some aspects, an apparatus for wireless communication at a network node includes one or more memories; and one or more processors, coupled to the one or more memories, configured to cause the network node to: receive PDU set traffic information in accordance with a PDU set traffic indicator, the PDU set traffic being associated with a PDU set that includes a plurality of PDUs associated with an application data unit; and process the PDU set traffic in accordance with the PDU set traffic information.

In some aspects, a non-transitory computer-readable medium storing a set of instructions for wireless communication includes one or more instructions that, when executed by one or more processors of a UE, cause the UE to: generate a signaling message that includes information associated with PDU set traffic, the PDU set traffic being associated with a PDU set that includes a plurality of PDUs associated with an application data unit, wherein the information associated with the PDU set traffic indicates at least one of a presence of the PDU set traffic, a start of the PDU set traffic, or an end of the PDU set traffic; and transmit the signaling message via one or more network layers.

In some aspects, a non-transitory computer-readable medium storing a set of instructions for wireless communication includes one or more instructions that, when executed by one or more processors of a UE, cause the UE to: detect a PDU set traffic indicator associated with PDU set traffic, the PDU set traffic being associated with a PDU set that includes a plurality of PDUs associated with an application data unit; and transmit PDU set traffic information in accordance with the PDU set traffic indicator.

In some aspects, a non-transitory computer-readable medium storing a set of instructions for wireless communication includes one or more instructions that, when executed by one or more processors of a network node, cause the network node to: receive, via one or more network layers, a signaling message that includes information associated with PDU set traffic, the PDU set traffic being associated with a PDU set that includes a plurality of PDUs associated with an application data unit, wherein the information associated with the PDU set traffic indicates at least one of a presence of the PDU set traffic, a start of the PDU set traffic, or an end of the PDU set traffic; and process the PDU set traffic in accordance with the signaling message.

In some aspects, a non-transitory computer-readable medium storing a set of instructions for wireless communication includes one or more instructions that, when executed by one or more processors of a network node, cause the network node to: receive PDU set traffic information in accordance with a PDU set traffic indicator, the PDU set traffic being associated with a PDU set that includes a plurality of PDUs associated with an application data unit; and process the PDU set traffic in accordance with the PDU set traffic information.

In some aspects, an apparatus for wireless communication includes means for generating a signaling message that includes information associated with PDU set traffic, the PDU set traffic being associated with a PDU set that includes a plurality of PDUs associated with an application data unit, wherein the information associated with the PDU set traffic indicates at least one of a presence of the PDU set traffic, a start of the PDU set traffic, or an end of the PDU set traffic; and means for transmitting the signaling message via one or more network layers.

In some aspects, an apparatus for wireless communication includes means for detecting a PDU set traffic indicator associated with PDU set traffic, the PDU set traffic being associated with a PDU set that includes a plurality of PDUs associated with an application data unit; and means for transmitting PDU set traffic information in accordance with the PDU set traffic indicator.

In some aspects, an apparatus for wireless communication includes means for receiving, via one or more network layers, a signaling message that includes information associated with PDU set traffic, the PDU set traffic being associated with a PDU set that includes a plurality of PDUs associated with an application data unit, wherein the information associated with the PDU set traffic indicates at least one of a presence of the PDU set traffic, a start of the PDU set traffic, or an end of the PDU set traffic; and means for processing the PDU set traffic in accordance with the signaling message.

In some aspects, an apparatus for wireless communication includes means for receiving PDU set traffic information in accordance with a PDU set traffic indicator, the PDU set traffic being associated with a PDU set that includes a plurality of PDUs associated with an application data unit; and means for processing the PDU set traffic in accordance with the PDU set traffic information.

Aspects generally include a method, apparatus, system, computer program product, non-transitory computer-readable medium, user equipment, base station, network entity, network node, wireless communication device, and/or processing system as substantially described herein with reference to and as illustrated by the drawings.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
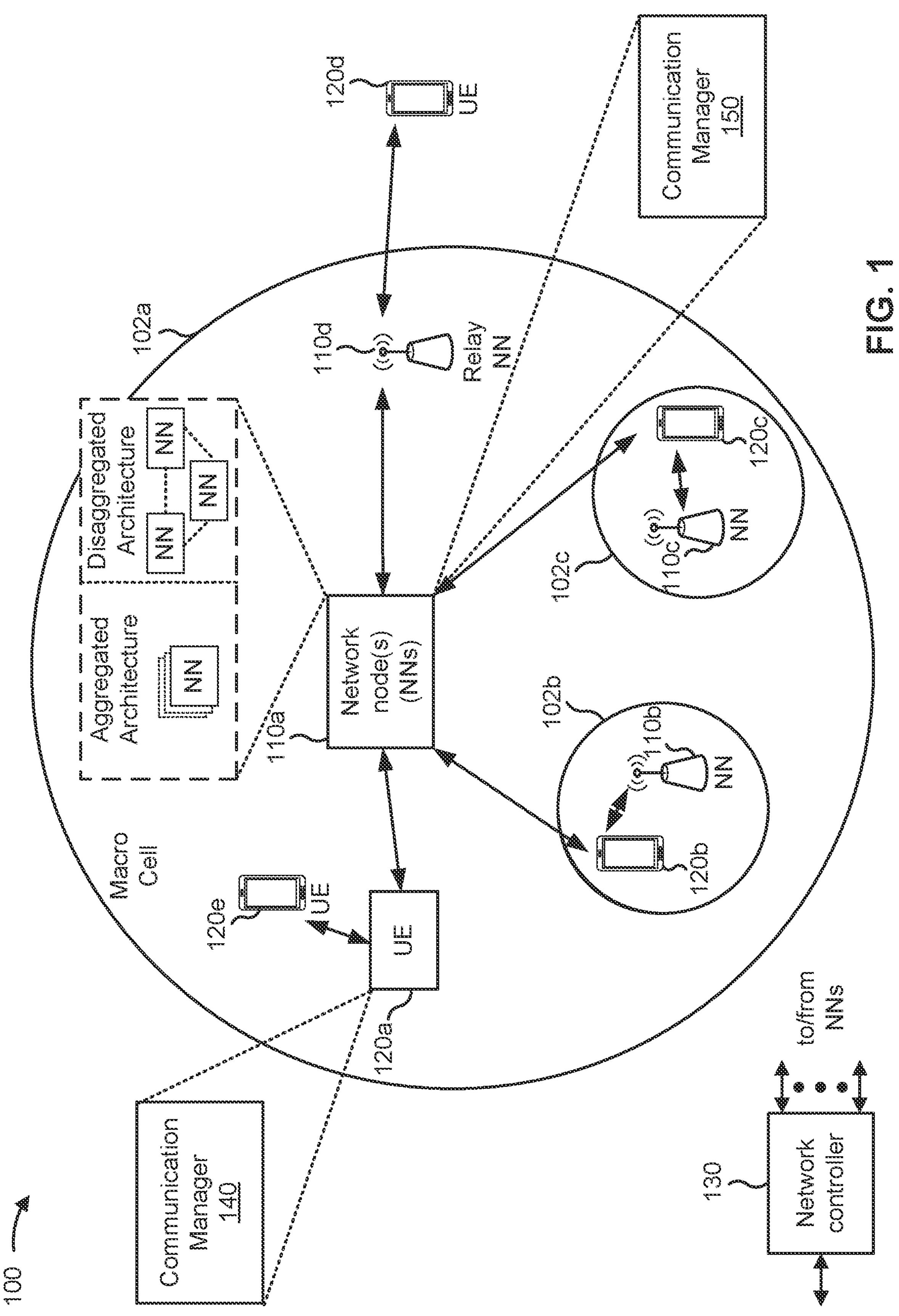
FIG. 1 is a diagram illustrating an example of a wireless network, in accordance with the present disclosure.

An application data unit (ADU) is a unit of data associated with an application. The ADU may be generated by the application and may include text, images, video, and/or other forms of user-generated content to be transmitted over a network. In one example, an ADU may be a video frame or image having a size of 300 kilobytes (KB). In contrast, a protocol data unit (PDU) is a unit of data that can vary in accordance with a specific protocol or layer within a protocol stack. At a networking layer, the PDU may be referred to as a packet. A packet may include the PDU and may include header information for routing, error checking, and control functions, among other examples. In one example, a PDU (or a packet that includes the PDU) may have a size of 1500 bytes. In some cases, an application may generate a plurality of ADUs, and each ADU may be divided into a group of PDUs for transmission over-the-air (OTA). A group of PDUs that are associated with a single ADU may be referred to as a PDU set. For example, a PDU set may include one or more PDUs, where each PDU in the PDU set is associated with a single ADU. This may enable the ADU to have certain quality of service (QOS) characteristics based, for example, on a latency, a throughput, or a forward error correction (FEC) property of the data included in the ADU. In one example, PDU-set-specific-traffic may be used for extended reality (XR) applications while PDU-specific-traffic may be used for general (e.g., Internet) applications.

In downlink communications, a presence of a PDU set within a data flow may be identified by a network node (e.g., a radio access network (RAN) node) in accordance with QoS parameters received from a core network. Additionally, or alternatively, the network node may receive PDU set boundary information from the core network. This may enable the network node to identify scheduling information for the PDU sets based at least in part on the PDU set QoS requirements. In contrast, in uplink communications, PDU-set-specific traffic information, such as a presence of the PDU set traffic, a start of the PDU set traffic, and/or a stop of the PDU set traffic, may not be able to be identified by the network node. For example, the network node may not receive PDU-set-specific traffic information, such as importance information, FEC-based-discard information, timer discard information, or mixed modal information, among other examples, associated with the PDU-set-specific traffic. This may result in the PDU-set-level packets not satisfying a latency threshold and/or may result in the PDU-set-level packets not satisfying a reliability threshold. Additionally, this may result in the PDU-set-level traffic having reduced key performance indicator (KPI) characteristics (e.g., from an uplink PDU set QoS perspective) as a result of the network node not being able to adjust scheduling policies for the uplink PDU set traffic.

Various aspects relate generally to wireless communications. Some aspects more specifically relate to communicating PDU set information. In some aspects, a user equipment (UE) may transmit capability information associated with PDU set traffic. For example, the UE may transmit, and a network node may receive, capability information indicating that the UE supports uplink PDU set identification. The UE may generate a signaling message that includes information associated with the PDU set traffic. For example, the UE may generate a signaling message that indicates at least one of a presence of the PDU set traffic, a start of the PDU set traffic, or an end of the PDU set traffic. The UE may transmit the signaling message via one or more network layers. For example, the UE may transmit, and the network node may receive, the signaling message via a service data application protocol (SDAP) layer, a packet data convergence protocol (PDCP) layer, or a medium access control (MAC) layer, among other examples. In some aspects, the UE may detect a PDU set traffic indicator associated with the PDU set traffic, and may transmit PDU set traffic information in accordance with the PDU set traffic indicator. For example, the UE may detect an interval for transmitting PDU set traffic, an occurrence of an event associated with the PDU set traffic, and/or a presence of the PDU set traffic, and may transmit the PDU set traffic information in accordance with the interval, the occurrence of the event, or the presence of the PDU set traffic. The network node may receive the PDU set traffic information from the UE, and may process PDU set traffic in accordance with the PDU set traffic information. In some cases, the network node, in accordance with a PDU set presence indication, may schedule an entirety of the traffic on a certain link (such as for MCG or SCG), or may allocate a different grant that satisfies one or more QoS requirements. For example, the network node may provide a grant for a certain link in accordance with a reliability of the link and/or a latency of the link (such as whether the link is associated with a terrestrial network node or a non-terrestrial network node) or may distribute the grant across a plurality of links.

Particular aspects of the subject matter described in this disclosure can be implemented to realize one or more of the following potential advantages. In some examples, by generating and transmitting PDU set traffic information, the described techniques can be used to enable a network node to schedule the PDU set traffic in accordance with the PDU set traffic information. For example, transmitting the PDU set traffic information to the network node may increase a likelihood that the PDU set traffic satisfies a latency threshold and/or a reliability threshold. In some examples, by generating and transmitting the PDU set traffic information, the described techniques can be used to configure traffic flow parameters, resource block parameters, and/or logical channel parameters. This may increase a likelihood that the PDU set traffic satisfies one or more quality of service requirements. In some examples, by generating and transmitting the PDU set traffic information, the described techniques may reduce network bandwidth, for example, by reducing the need for transmitting per-packet control information. These example advantages, among others, are described in more detail below.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more network nodes 110 (shown as a network node 110*a*, a network node 110*b*, a network node 110*c*, and a network node 110*d*), a UE 120 or multiple UEs 120 (shown as a UE 120*a*, a UE 120*b*, a UE 120*c*, a UE 120*d*, and a UE 120*c*), and/or other entities. A network node 110 is a network node that communicates with UEs 120. As shown, a network node 110 may include one or more network nodes. For example, a network node 110 may be an aggregated network node, meaning that the aggregated network node is configured to utilize a radio protocol stack that is physically or logically integrated within a single radio access network (RAN) node (e.g., within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUs)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, and/or one or more DUs. A network node 110 may include, for example, an NR base station, an LTE base station, a Node B, an eNB (e.g., in 4G), a gNB (e.g., in 5G), an access point, a transmission reception point (TRP), a DU, an RU, a CU, a mobility element of a network, a core network node, a network element, a network equipment, a RAN node, or a combination thereof. In some examples, the network nodes 110 may be interconnected to one another or to one or more other network nodes 110 in the wireless network 100 through various types of fronthaul, midhaul, and/or backhaul interfaces, such as a direct physical connection, an air interface, or a virtual network, using any suitable transport network.

In some examples, a network node 110 may provide communication coverage for a particular geographic area. In the Third Generation Partnership Project (3GPP), the term "cell" can refer to a coverage area of a network node 110 and/or a network node subsystem serving this coverage area, depending on the context in which the term is used. A network node 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (e.g., a home) and may allow restricted access by UEs 120 having association with the femto cell (e.g., UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In the example shown in FIG. 1, the network node 110*a* may be a macro network node for a macro cell 102*a*, the network node 110*b* may be a pico network node for a pico cell 102*b*, and the network node 110*c* may be a femto network node for a femto cell 102*c*. A network node may support one or multiple (e.g., three) cells. In some examples, a cell may not necessarily be stationary, and the geographic area of the cell may move according to the location of a network node 110 that is mobile (e.g., a mobile network node).

In some aspects, the terms "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), or a Non-Real Time (Non-RT) RIC, or a combination thereof. In some aspects, the terms "base station" or "network node" may refer to one device configured to perform one or more functions, such as those described herein in connection with the network node 110. In some aspects, the terms "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the terms "base station" or "network node" may refer to any one or more of those different devices. In some aspects, the terms "base station" or "network node" may refer to one or more virtual base stations or one or more virtual base station functions. For example, in some aspects, two or more base station functions may be instantiated on a single device. In some aspects, the terms "base station" or "network node" may refer to one of the base station functions and not another. In this way, a single device may include more than one base station.

The wireless network 100 may include one or more relay stations. A relay station is a network node that can receive a transmission of data from an upstream node (e.g., a network node 110 or a UE 120) and send a transmission of the data to a downstream node (e.g., a UE 120 or a network node 110). A relay station may be a UE 120 that can relay transmissions for other UEs 120. In the example shown in FIG. 1, the network node 110*d* (e.g., a relay network node) may communicate with the network node 110*a* (e.g., a macro network node) and the UE 120*d* in order to facilitate communication between the network node 110*a* and the UE 120*d*. A network node 110 that relays communications may be referred to as a relay station, a relay base station, a relay network node, a relay node, a relay, or the like.

The wireless network 100 may be a heterogeneous network that includes network nodes 110 of different types, such as macro network nodes, pico network nodes, femto network nodes, relay network nodes, or the like. These different types of network nodes 110 may have different transmit power levels, different coverage areas, and/or different impacts on interference in the wireless network 100. For example, macro network nodes may have a high transmit power level (e.g., 5 to 40 watts) whereas pico network nodes, femto network nodes, and relay network nodes may have lower transmit power levels (e.g., 0.1 to 2 watts).

A network controller 130 may couple to or communicate with a set of network nodes 110 and may provide coordination and control for these network nodes 110. The network controller 130 may communicate with the network nodes 110 via a backhaul communication link or a midhaul communication link. The network nodes 110 may communicate with one another directly or indirectly via a wireless or wireline backhaul communication link. In some aspects, the network controller 130 may be a CU or a core network device, or may include a CU or a core network device.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, a UE function of a network node, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, an unmanned aerial vehicle, a remote device, a sensor, a meter, a monitor, and/or a location tag, that may communicate with a network node, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120*a* and UE 120*c*) may communicate directly using one or more sidelink channels (e.g., without using a network node 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the network node 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHZ) and FR2 (24.25 GHZ-52.6 GHZ). It should be understood that although a portion of FR1 is greater than 6 GHZ, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHZ-300 GHZ) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHZ-24.25 GHZ). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHZ. For example, three higher operating bands have been identified as frequency range designations FR4a or FR4-1 (52.6 GHZ-71 GHz), FR4 (52.6 GHz-114.25 GHZ), and FR5 (114.25 GHZ-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHZ, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. In some aspects, as described in more detail elsewhere herein, the communication manager 140 may generate a signaling message that includes information associated with PDU set traffic, the PDU set traffic being associated with a PDU set that includes a plurality of PDUs associated with an application data unit, wherein the information associated with the PDU set traffic indicates at least one of a presence of the PDU set traffic, a start of the PDU set traffic, or an end of the PDU set traffic; and transmit the signaling message via one or more network layers. In some other aspects, as described in more detail elsewhere herein, the communication manager 140 may detect a PDU set traffic indicator associated with PDU set traffic, the PDU set traffic being associated with a PDU set that includes a plurality of PDUs associated with an application data unit; and transmit PDU set traffic information in accordance with the PDU set traffic indicator. Additionally, or alternatively, the communication manager 140 may perform one or more other operations described herein.

In some aspects, the network node 110 may include a communication manager 150. In some aspects, as described in more detail elsewhere herein, the communication manager 150 may receive, via one or more network layers, a signaling message that includes information associated with PDU set traffic, the PDU set traffic being associated with a PDU set that includes a plurality of PDUs associated with an application data unit, wherein the information associated with the PDU set traffic indicates at least one of a presence of the PDU set traffic, a start of the PDU set traffic, or an end of the PDU set traffic; and process the PDU set traffic in accordance with the signaling message. In some other aspects, as described in more detail elsewhere herein, the communication manager 150 may receive PDU set traffic information in accordance with a PDU set traffic indicator, the PDU set traffic being associated with a PDU set that includes a plurality of PDUs associated with an application data unit; and process the PDU set traffic in accordance with the PDU set traffic information. Additionally, or alternatively, the communication manager 150 may perform one or more other operations described herein.

As indicated above, FIG. 1 is provided as an example. Other examples may differ from what is described with regard to FIG. 1.

Figure 2:
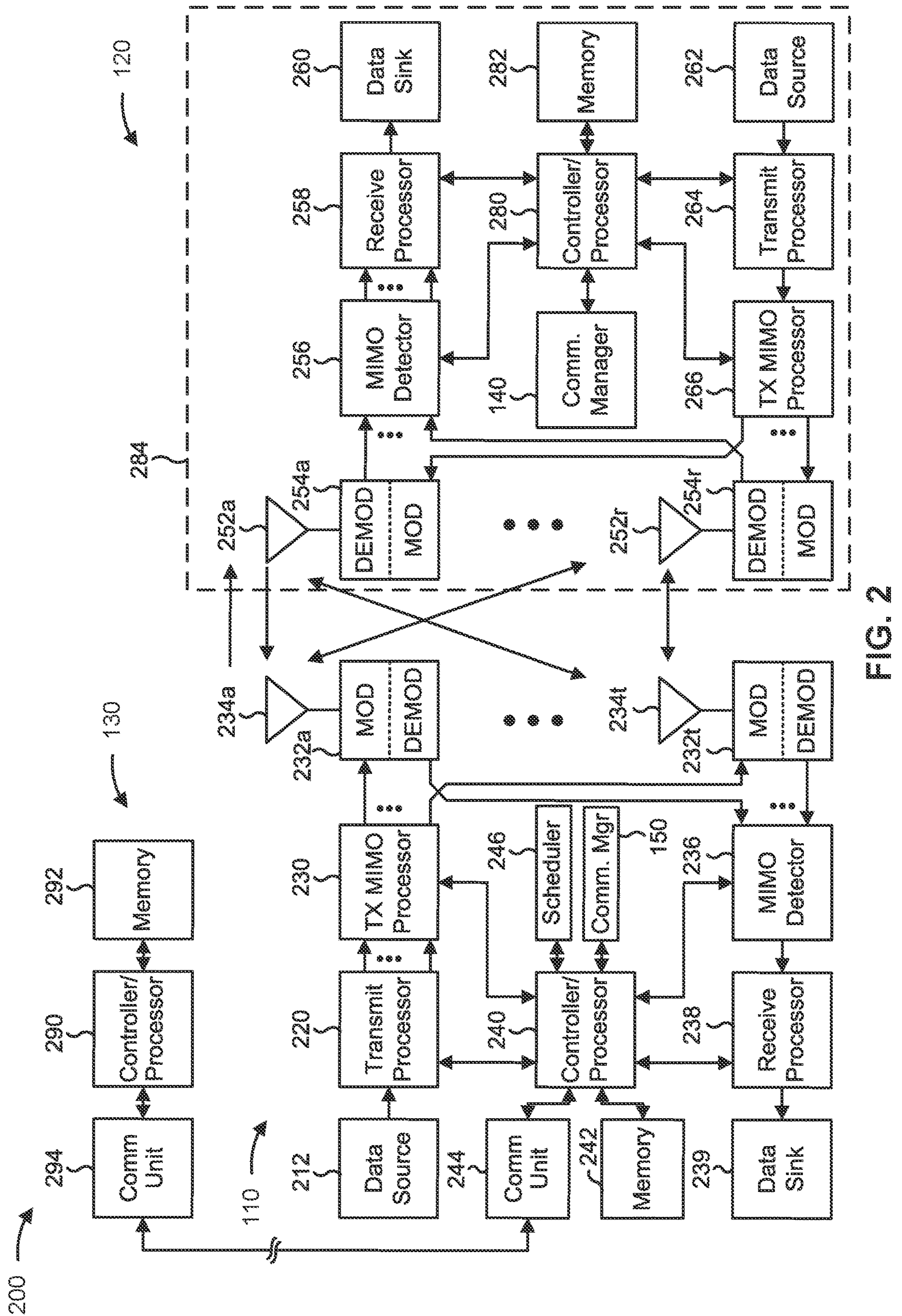
FIG. 2 is a diagram illustrating an example of a network node in communication with a user equipment (UE) in a wireless network, in accordance with the present disclosure.

FIG. 2 is a diagram illustrating an example 200 of a network node 110 in communication with a UE 120 in a wireless network 100, in accordance with the present disclosure. The network node 110 may be equipped with a set of antennas 234*a* through 234*t*, such as T antennas (T≥1). The UE 120 may be equipped with a set of antennas 252*a* through 252*r*, such as R antennas (R≥1). The network node 110 of example 200 includes one or more radio frequency components, such as antennas 234 and a modem 232. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The network node 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232*a* through 232*t*. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232*a* through 232*t* may transmit a set of downlink signals (e.g., T downlink signals) via a corresponding set of antennas 234 (e.g., T antennas), shown as antennas 234*a* through 234*t*.

At the UE 120, a set of antennas 252 (shown as antennas 252*a* through 252*r*) may receive the downlink signals from the network node 110 and/or other network nodes 110 and may provide a set of received signals (e.g., R received signals) to a set of modems 254 (e.g., R modems), shown as modems 254*a* through 254*r*. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (e.g., antennas 234*a* through 234*t* and/or antennas 252*a* through 252*r*) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 5-11).

At the network node 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink and/or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 5-11).

The controller/processor 240 of the network node 110, the controller/processor 280 of the UE 120, and/or any other component(s) of FIG. 2 may perform one or more techniques associated with communicating PDU set traffic information, as described in more detail elsewhere herein. For example, the controller/processor 240 of the network node 110, the controller/processor 280 of the UE 120, and/or any other component(s) of FIG. 2 may perform or direct operations of, for example, process 600 of FIG. 6, process 700 of FIG. 7, process 800 of FIG. 8, process 900 of FIG. 9, and/or other processes as described herein. The memory 242 and the memory 282 may store data and program codes for the network node 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the network node 110 and/or the UE 120, may cause the one or more processors, the UE 120, and/or the network node 110 to perform or direct operations of, for example, process 600 of FIG. 6, process 700 of FIG. 7, process 800 of FIG. 8, process 900 of FIG. 9, and/or other processes as described herein. In some examples, executing instructions may include running the instructions, converting the instructions, compiling the instructions, and/or interpreting the instructions, among other examples.

In some aspects, the UE 120 includes means for generating a signaling message that includes information associated with PDU set traffic, the PDU set traffic being associated with a PDU set that includes a plurality of PDUs associated with an application data unit, wherein the information associated with the PDU set traffic indicates at least one of a presence of the PDU set traffic, a start of the PDU set traffic, or an end of the PDU set traffic; and/or means for transmitting the signaling message via one or more network layers.

In some aspects, the UE 120 includes means for detecting a PDU set traffic indicator associated with PDU set traffic, the PDU set traffic being associated with a PDU set that includes a plurality of PDUs associated with an application data unit; and/or means for transmitting PDU set traffic information in accordance with the PDU set traffic indicator. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the network node 110 includes means for receiving, via one or more network layers, a signaling message that includes information associated with PDU set traffic, the PDU set traffic being associated with a PDU set that includes a plurality of PDUs associated with an application data unit, wherein the information associated with the PDU set traffic indicates at least one of a presence of the PDU set traffic, a start of the PDU set traffic, or an end of the PDU set traffic; and/or means for processing the PDU set traffic in accordance with the signaling message.

In some aspects, the network node 110 includes means for receiving PDU set traffic information in accordance with a PDU set traffic indicator, the PDU set traffic being associated with a PDU set that includes a plurality of PDUs associated with an application data unit; and/or means for processing the PDU set traffic in accordance with the PDU set traffic information. The means for the network node to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

In some aspects, an individual processor may perform all of the functions described as being performed by the one or more processors. In some aspects, one or more processors may collectively perform a set of functions. For example, a first set of (one or more) processors of the one or more processors may perform a first function described as being performed by the one or more processors, and a second set of (one or more) processors of the one or more processors may perform a second function described as being performed by the one or more processors. The first set of processors and the second set of processors may be the same set of processors or may be different sets of processors. Reference to "one or more processors" should be understood to refer to any one or more of the processors described in connection with FIG. 2. Reference to "one or more memories" should be understood to refer to any one or more memories of a corresponding device, such as the memory described in connection with FIG. 2. For example, functions described as being performed by one or more memories can be performed by the same subset of the one or more memories or different subsets of the one or more memories.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR base station, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station (e.g., an aggregated network node) may be configured to utilize a radio protocol stack that is physically or logically integrated within a single RAN node (e.g., within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU, and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
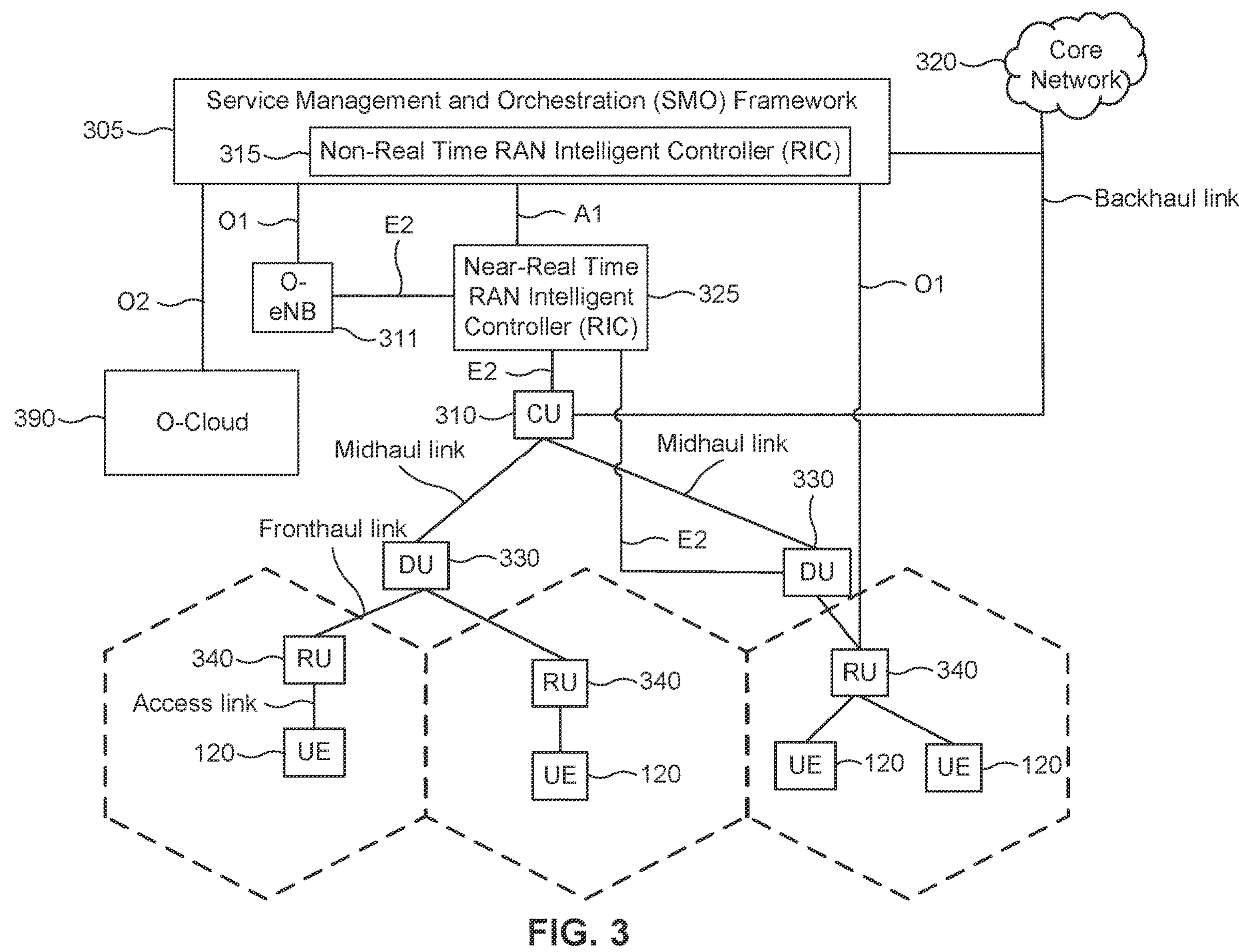
FIG. 3 is a diagram illustrating an example disaggregated base station architecture, in accordance with the present disclosure.

FIG. 3 is a diagram illustrating an example disaggregated base station architecture 300, in accordance with the present disclosure. The disaggregated base station architecture 300 may include a CU 310 that can communicate directly with a core network 320 via a backhaul link, or indirectly with the core network 320 through one or more disaggregated control units (such as a Near-RT RIC 325 via an E2 link, or a Non-RT RIC 315 associated with a Service Management and Orchestration (SMO) Framework 305, or both). A CU 310 may communicate with one or more DUs 330 via respective midhaul links, such as through F1 interfaces. Each of the DUs 330 may communicate with one or more RUs 340 via respective fronthaul links. Each of the RUs 340 may communicate with one or more UEs 120 via respective radio frequency (RF) access links. In some implementations, a UE 120 may be simultaneously served by multiple RUs 340.

Each of the units, including the CUs 310, the DUs 330, the RUs 340, as well as the Near-RT RICs 325, the Non-RT RICs 315, and the SMO Framework 305, may include one or more interfaces or be coupled with one or more interfaces configured to receive or transmit signals, data, or information (collectively, signals) via a wired or wireless transmission medium. Each of the units, or an associated processor or controller providing instructions to one or multiple communication interfaces of the respective unit, can be configured to communicate with one or more of the other units via the transmission medium. In some examples, each of the units can include a wired interface, configured to receive or transmit signals over a wired transmission medium to one or more of the other units, and a wireless interface, which may include a receiver, a transmitter or transceiver (such as an RF transceiver), configured to receive or transmit signals, or both, over a wireless transmission medium to one or more of the other units.

In some aspects, the CU 310 may host one or more higher layer control functions. Such control functions can include radio resource control (RRC) functions, packet data convergence protocol (PDCP) functions, or service data adaptation protocol (SDAP) functions, among other examples. Each control function can be implemented with an interface configured to communicate signals with other control functions hosted by the CU 310. The CU 310 may be configured to handle user plane functionality (for example, Central Unit-User Plane (CU-UP) functionality), control plane functionality (for example, Central Unit-Control Plane (CU-CP) functionality), or a combination thereof. In some implementations, the CU 310 can be logically split into one or more CU-UP units and one or more CU-CP units. A CU-UP unit can communicate bidirectionally with a CU-CP unit via an interface, such as the E1 interface when implemented in an O-RAN configuration. The CU 310 can be implemented to communicate with a DU 330, as necessary, for network control and signaling.

Each DU 330 may correspond to a logical unit that includes one or more base station functions to control the operation of one or more RUs 340. In some aspects, the DU 330 may host one or more of a radio link control (RLC) layer, a MAC layer, and one or more high physical (PHY) layers depending, at least in part, on a functional split, such as a functional split defined by the 3GPP. In some aspects, the one or more high PHY layers may be implemented by one or more modules for forward error correction (FEC) encoding and decoding, scrambling, and modulation and demodulation, among other examples. In some aspects, the DU 330 may further host one or more low PHY layers, such as implemented by one or more modules for a fast Fourier transform (FFT), an inverse FFT (iFFT), digital beamforming, or physical random access channel (PRACH) extraction and filtering, among other examples. Each layer (which also may be referred to as a module) can be implemented with an interface configured to communicate signals with other layers (and modules) hosted by the DU 330, or with the control functions hosted by the CU 310.

Each RU 340 may implement lower-layer functionality. In some deployments, an RU 340, controlled by a DU 330, may correspond to a logical node that hosts RF processing functions or low-PHY layer functions, such as performing an FFT, performing an iFFT, digital beamforming, or PRACH extraction and filtering, among other examples, based on a functional split (for example, a functional split defined by the 3GPP), such as a lower layer functional split. In such an architecture, each RU 340 can be operated to handle over the air (OTA) communication with one or more UEs 120. In some implementations, real-time and non-real-time aspects of control and user plane communication with the RU(s) 340 can be controlled by the corresponding DU 330. In some scenarios, this configuration can enable each DU 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements, which may be managed via an operations and maintenance interface (such as an O1 interface). For virtualized network elements, the SMO Framework 305 may be configured to interact with a cloud computing platform (such as an open cloud (O-Cloud) platform 390) to perform network element life cycle management (such as to instantiate virtualized network elements) via a cloud computing platform interface (such as an O2 interface). Such virtualized network elements can include, but are not limited to, CUs 310, DUs 330, RUs 340, non-RT RICs 315, and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with each of one or more RUs 340 via a respective O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via an O1 interface) or via creation of RAN management policies (such as A1 interface policies).

As indicated above, FIG. 3 is provided as an example. Other examples may differ from what is described with regard to FIG. 3.

Figure 4:
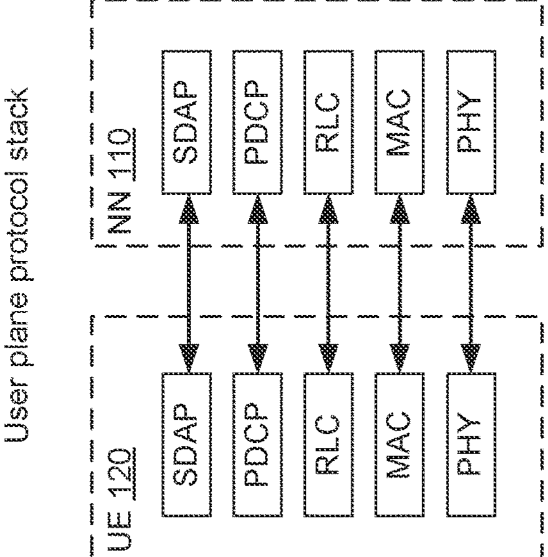
FIG. 4 is a diagram illustrating an example of a user plane protocol stack and a control plane protocol stack for a network node and a core network in communication with a UE, in accordance with the present disclosure.

FIG. 4 is a diagram illustrating an example 400 of a user plane protocol stack and a control plane protocol stack for a network node 110 and a core network in communication with a UE 120, in accordance with the present disclosure. In some aspects, the network node 110 (shown as NN 110) may include a plurality of network nodes 110. In some aspects, protocol stack functions of the network node 110 may be distributed across multiple network nodes 110. For example, a first network node 110 may implement a first layer of a protocol stack and a second network node 110 may implement a second layer of the protocol stack. The distribution of the protocol stack across network nodes (in examples where the protocol stack is distributed across network nodes) may be based at least in part on a functional split, as described elsewhere herein. It should be understood that references to "a network node 110" or "the network node 110" can, in some aspects, refer to multiple network nodes.

On the user plane, the UE 120 and the network node 110 may include respective physical (PHY) layers, MAC layers, radio link control (RLC) layers, packet data convergence protocol (PDCP) layers, and service data adaptation protocol (SDAP) layers. A user plane function may handle transport of user data between the UE 120 and the network node 110. On the control plane, the UE 120 and the network node 110 may include respective radio resource control (RRC) layers. Furthermore, the UE 120 may include a non-access stratum (NAS) layer in communication with an NAS layer of an access and management mobility function (AMF). The AMF may be associated with a core network associated with the network node 110, such as a 5G core network (5GC) or a next-generation radio access network (NG-RAN). A control plane function may handle transport of control information between the UE and the core network. Generally, a first layer is referred to as higher than a second layer if the first layer is further from the PHY layer than the second layer. For example, the PHY layer may be referred to as a lowest layer, and the SDAP/PDCP/RLC/MAC layer may be referred to as higher than the PHY layer and lower than the RRC layer. An application (APP) layer, not shown in FIG. 4, may be higher than the SDAP/PDCP/RLC/MAC layer. In some cases, an entity may handle the services and functions of a given layer (e.g., a PDCP entity may handle the services and functions of the PDCP layer), though the description herein refers to the layers themselves as handling the services and functions.

The RRC layer may handle communications related to configuring and operating the UE 120, such as: broadcast of system information related to the access stratum (AS) and the NAS; paging initiated by the 5GC or the NG-RAN; establishment, maintenance, and release of an RRC connection between the UE and the NG-RAN, including addition, modification, and release of carrier aggregation, as well as addition, modification, and release of dual connectivity; security functions including key management; establishment, configuration, maintenance, and release of signaling radio bearers (SRBs) and data radio bearers (DRBs); mobility functions (e.g., handover and context transfer, UE cell selection and reselection and control of cell selection and reselection, inter-RAT mobility); quality of service (QOS) management functions; UE measurement reporting and control of the reporting; detection of and recovery from radio link failure; and NAS message transfer between the NAS layer and the lower layers of the UE 120. The RRC layer is frequently referred to as Layer 3 (L3).

The SDAP layer, PDCP layer, RLC layer, and MAC layer may be collectively referred to as Layer 2 (L2). Thus, in some cases, the SDAP, PDCP, RLC, and MAC layers are referred to as sublayers of Layer 2. On the transmitting side (e.g., if the UE 120 is transmitting an uplink communication or the network node 110 is transmitting a downlink communication), the SDAP layer may receive a data flow in the form of a QoS flow. A QoS flow is associated with a QoS identifier, which identifies a QoS parameter associated with the QoS flow, and a QoS flow identifier (QFI), which identifies the QoS flow. Policy and charging parameters are enforced at the QoS flow granularity. A QoS flow can include one or more service data flows (SDFs), so long as each SDF of a QoS flow is associated with the same policy and charging parameters. In some aspects, the RRC/NAS layer may generate control information to be transmitted and may map the control information to one or more radio bearers for provision to the PDCP layer.

The SDAP layer, or the RRC/NAS layer, may map QoS flows or control information to radio bearers. Thus, the SDAP layer may be said to handle QoS flows on the transmitting side. The SDAP layer may provide the QoS flows to the PDCP layer via the corresponding radio bearers. The PDCP layer may map radio bearers to RLC channels. The PDCP layer may handle various services and functions on the user plane, including sequence numbering, header compression and decompression (if robust header compression is enabled), transfer of user data, reordering and duplicate detection (if in-order delivery to layers above the PDCP layer is required), PDCP PDU routing (in case of split bearers), retransmission of PDCP service data units (SDUs), ciphering and deciphering. PDCP SDU discard (e.g., in accordance with a timer, as described elsewhere herein), PDCP re-establishment and data recovery for RLC acknowledged mode (AM), and duplication of PDCP PDUs. The PDCP layer may handle similar services and functions on the control plane, including sequence numbering, ciphering, deciphering, integrity protection, transfer of control plane data, duplicate detection, and duplication of PDCP PDUs.

The PDCP layer may provide data, in the form of PDCP PDUs, to the RLC layer via RLC channels. The RLC layer may handle transfer of upper layer PDUs to the MAC and/or PHY layers, sequence numbering independent of PDCP sequence numbering, error correction via automatic repeat requests (ARQ), segmentation and re-segmentation, reassembly of an SDU, RLC SDU discard, and RLC re-establishment.

The RLC layer may provide data, mapped to logical channels, to the MAC layer. The services and functions of the MAC layer include mapping between logical channels and transport channels (used by the PHY layer as described below), multiplexing/demultiplexing of MAC SDUs belonging to one or different logical channels into/from transport blocks (TBs) delivered to/from the physical layer on transport channels, scheduling information reporting, error correction through hybrid ARQ (HARQ), priority handling between UEs by means of dynamic scheduling, priority handling between logical channels of one UE by means of logical channel prioritization, and padding.

The MAC layer may package data from logical channels into TBs, and may provide the TBs on one or more transport channels to the PHY layer. The PHY layer may handle various operations relating to transmission of a data signal, as described in more detail in connection with FIG. 2. The PHY layer is frequently referred to as Layer 1 (L1).

On the receiving side (e.g., if the UE 120 is receiving a downlink communication or the network node 110 is receiving an uplink communication), the operations may be similar to those described for the transmitting side, but reversed. For example, the PHY layer may receive TBs and may provide the TBs on one or more transport channels to the MAC layer. The MAC layer may map the transport channels to logical channels and may provide data to the RLC layer via the logical channels. The RLC layer may map the logical channels to RLC channels and may provide data to the PDCP layer via the RLC channels. The PDCP layer may map the RLC channels to radio bearers and may provide data to the SDAP layer or the RRC/NAS layer via the radio bearers.

Data may be passed between the layers in the form of PDUs and SDUs. An SDU is a unit of data that has been passed from a layer or sublayer to a lower layer. For example, the PDCP layer may receive a PDCP SDU. A given layer may then encapsulate the unit of data into a PDU and may pass the PDU to a lower layer. For example, the PDCP layer may encapsulate the PDCP SDU into a PDCP PDU and may pass the PDCP PDU to the RLC layer. The RLC layer may receive the PDCP PDU as an RLC SDU, may encapsulate the RLC SDU into an RLC PDU, and so on. In effect, the PDU carries the SDU as a payload.

As indicated above, FIG. 4 is provided as an example. Other examples may differ from what is described with regard to FIG. 4.

Figure 5:
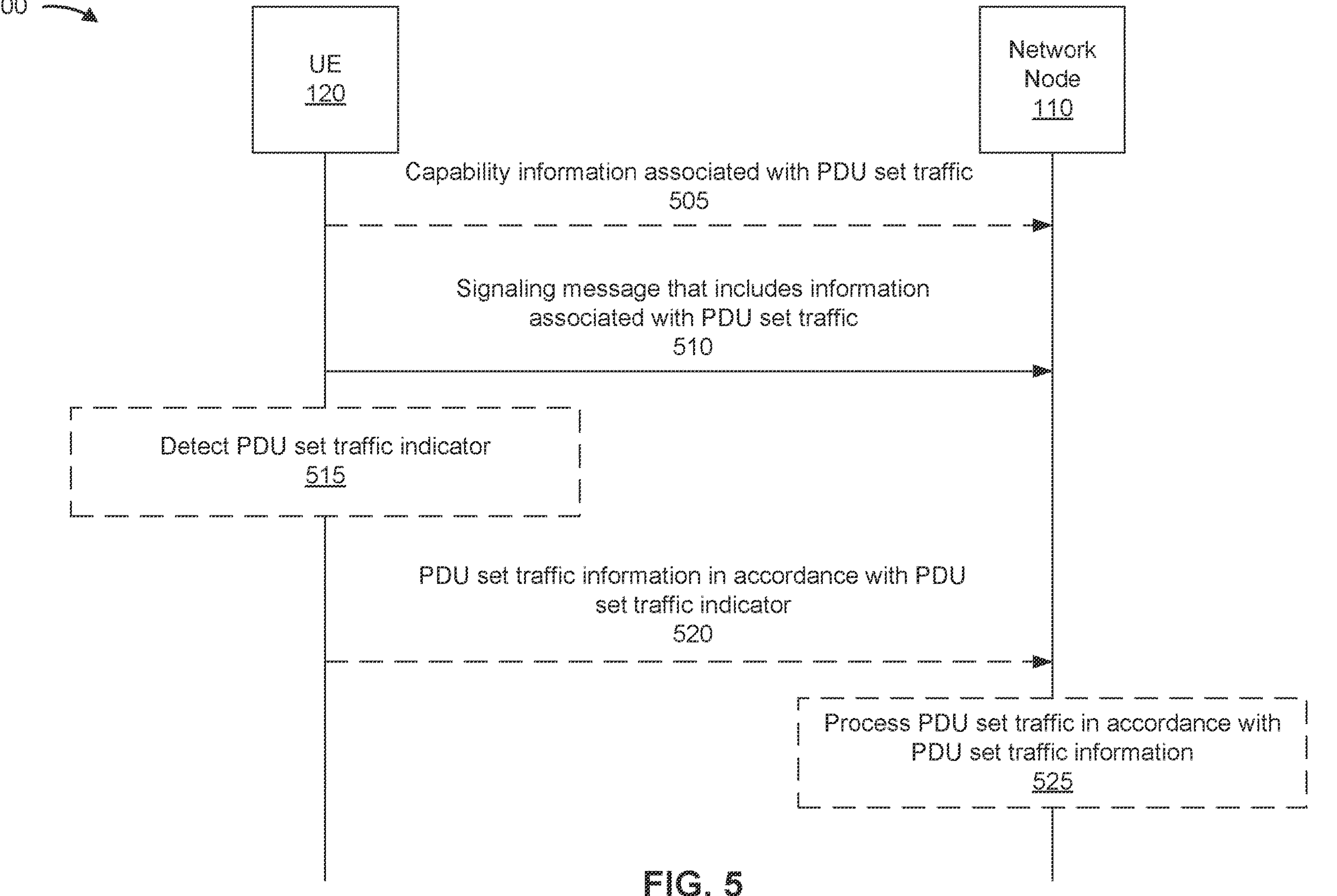
FIG. 5 is a diagram illustrating an example of communicating protocol data unit set information, in accordance with the present disclosure.

FIG. 5 is a diagram illustrating an example 500 of communicating protocol data unit set information, in accordance with the present disclosure. The UE 120 may communicate with the network node 110. In some aspects, the network node 110 may be a core network node and/or a RAN node. For example, the network node 110 may be the code network node, may be the RAN node, or may be a device that includes the core network node and the RAN node. Alternatively, the network node 110 may be another network device that is in communication with the core network node and/or the RAN node.

As shown by reference number 505, the UE 120 may transmit, and the network node 110 may receive, capability information associated with PDU set traffic. For example, the UE 120 may transmit, and a user plane function (UPF) associated with the core network node may receive, a non-access stratum (NAS) capability message indicating that the UE 120 supports uplink PDU set identification.

In some aspects, the core network node may identify PDU set level information in accordance with combining (e.g., after combining) a plurality of SDAP packets (received in an uplink communication) into an ADU. The core network node may provide the PDU set level information for a given QoS flow to a RAN node. The RAN node may associate the PDU set level information with a PDCP resource block (RB) on which the flow is mapped. In this case, the uplink PDU set information may be mapped from the core network to the RAN, which may improve scheduling for the PDU set level traffic.

As shown by reference number 510, the UE 120 may transmit, and the network node 110 may receive, a signaling message that includes information associated with PDU set traffic. The PDU set traffic may include one or more PDU sets, and each PDU set of the one or more PDU sets may include a plurality of PDUs that are associated with a single ADU. In some aspects, the information associated with the PDU set traffic may indicate a presence of the PDU set traffic, a start of the PDU set traffic, and/or an end of the PDU set traffic, among other examples. In some aspects, transmitting the signaling message that includes the information associated with the PDU set traffic may be performed without changing per-packet information or per-packet headers.

In some aspects, transmitting the signaling message that includes the information associated with the PDU set traffic may include transmitting the signaling message via the SDAP layer. For example, since the PDU set information is specific to a data flow, the signaling message may be indicated as part of an SDAP control PDU from the UE 120 to the network node 110. This may enable the RAN to identify the bearer on which the flow is mapped, which may improve scheduling for the PDU set traffic.

In some aspects, transmitting the signaling message that includes the information associated with the PDU set traffic may include transmitting the signaling message via the PDCP layer. For example, as long as at least one flow with PDU set traffic is present, a PDCP resource block may indicate the presence of the PDU set traffic, the start of the PDU set traffic, or the stop of the PDU set traffic, using a PDCP control PDU.

In some aspects, transmitting the signaling message that includes the information associated with the PDU set traffic may include transmitting the signaling message via a MAC control element (MAC-CE). For example, the presence of the PDU set traffic on a given resource block associated with a logical channel may be used as part of a MAC-CE to indicate the PDU set traffic information to the RAN. In one example, transmitting the signaling message via the MAC-CE may include transmitting a MAC-CE that includes the PDU set traffic information and a logical channel identifier.

In some aspects, transmitting the signaling message that includes the information associated with the PDU set traffic may include transmitting the signaling message via UE assistance information (UAI). For example, the UE 120 may transmit, and the network node 110 may receive, UAI that indicates the presence of the PDU set traffic to the RAN at the UE-level, RB-level, or flow-level.

In some aspects, transmitting the signaling message that includes the information associated with the PDU set traffic may include transmitting the signaling message via uplink control information (UCI). For example, the UE 120 may transmit, and the network node 110 may receive, UCI that indicates the presence of the PDU set traffic at the UE-level or at a physical uplink shared channel (PUSCH)-level.

As shown by reference number 515, the UE 120 may detect a PDU set traffic indicator. The PDU set traffic indicator may be an indication of a presence of the PDU set traffic, an indication of an interval for transmitting the PDU set traffic, and/or an indication of an event associated with the PDU set traffic, among other examples. In some aspects, the UE 120 may detect the PDU set traffic indicator in accordance with detecting the presence of PDU set traffic (e.g., detecting that PDU set traffic is to be transmitted to the network node 110). In some other aspects, the UE 120 may detect the PDU set traffic indicator in accordance with detecting an interval for transmitting the PDU set. For example, the UE 120 may detect that the PDU set traffic is to be transmitted every 10 milliseconds (ms). In some other aspects, the UE 120 may detect the PDU set traffic indicator in accordance with detecting an occurrence of an event associated with the PDU set traffic. In one example, the event associated with the PDU set traffic may be a movement of the network node 110. In another example, the event associated with the PDU set traffic may be a change to a connection associated with the network node 110, such as a change to a connection associated with a DU of the network node 110.

As shown by reference number 520, the UE 120 may transmit, and the network node 110 may receive, PDU set traffic information in accordance with the PDU set traffic indicator. For example, the UE 120 may transmit the PDU set traffic information in accordance with detecting the presence of the PDU set traffic, in accordance with the interval for transmitting the PDU set traffic, and/or in accordance with detecting the occurrence of the event associated with the PDU set traffic. In some aspects, transmitting the PDU set traffic information in accordance with detecting the occurrence of the event associated with the PDU set traffic may include transmitting the PDU set traffic information in accordance with detecting that the network node 110 has moved from a first location to a second location. In some other aspects, transmitting the PDU set traffic information in accordance with detecting the occurrence of the event associated with the PDU set traffic may include transmitting the PDU set traffic information in accordance with detecting that a connection associated with the DU is different, at a current time, than a connection associated with the DU at a previous time (e.g., a time associated with a start of the PDU set traffic). In some other aspects, transmitting the PDU set traffic information in accordance with detecting the occurrence of the event associated with the PDU set traffic may include transmitting the PDU set traffic information in accordance with detecting a handover by the network node 110, a CU change, a DU change, or a UPF change, among other examples. In some aspects, transmitting the PDU set traffic information may include transmitting UCI that includes the PDU set traffic information.

As shown by reference number 525, the network node 110 may process the PDU set traffic in accordance with the PDU set traffic information. For example, the network node 110 (e.g., the RAN node) may configure a flow parameter, a resource block parameter, a logical channel parameter (such as a logical channel priority parameter and/or a logical channel group mapping parameter), a timer discard parameter, a scheduling request parameter, and/or a buffer status report parameter, among other examples, in accordance with the PDU set traffic information. As described herein, this may increase a likelihood that the PDU set traffic satisfies a latency threshold and/or a reliability threshold, may increase a likelihood that the PDU set traffic satisfies one or more QoS requirements, and/or may reduce a need for transmitting per-packet control information, among other advantages.

As indicated above, FIG. 5 is provided as an example. Other examples may differ from what is described with regard to FIG. 5.

Figure 6:
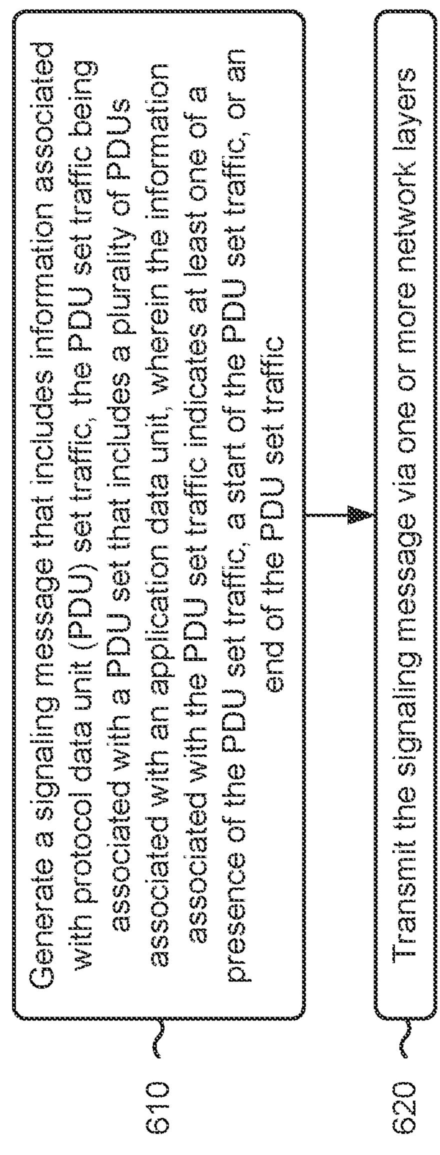
FIG. 6 is a diagram illustrating an example process performed, for example, at a UE or an apparatus of a UE, in accordance with the present disclosure.

FIG. 6 is a diagram illustrating an example process 600 performed, for example, at a UE or an apparatus of a UE, in accordance with the present disclosure. Example process 600 is an example where the apparatus or the UE (e.g., UE 120) performs operations associated with communicating PDU set traffic information.

As shown in FIG. 6, in some aspects, process 600 may include generating a signaling message that includes information associated with PDU set traffic, the PDU set traffic being associated with a PDU set that includes a plurality of PDUs associated with an application data unit, wherein the information associated with the PDU set traffic indicates at least one of a presence of the PDU set traffic, a start of the PDU set traffic, or an end of the PDU set traffic (block 610). For example, the UE (e.g., using communication manager 1006, depicted in FIG. 10) may generate a signaling message that includes information associated with PDU set traffic, the PDU set traffic being associated with a PDU set that includes a plurality of PDUs associated with an application data unit, wherein the information associated with the PDU set traffic indicates at least one of a presence of the PDU set traffic, a start of the PDU set traffic, or an end of the PDU set traffic, as described above.

As further shown in FIG. 6, in some aspects, process 600 may include transmitting the signaling message via one or more network layers (block 620). For example, the UE (e.g., using transmission component 1004 and/or communication manager 1006, depicted in FIG. 10) may transmit the signaling message via one or more network layers, as described above.

Process 600 may include additional aspects, such as any single aspect or any combination of aspects described below and/or in connection with one or more other processes described elsewhere herein.

In a first aspect, process 600 includes transmitting capability information associated with the PDU set traffic.

In a second aspect, alone or in combination with the first aspect, transmitting the capability information associated with the PDU set traffic comprises transmitting an indication that the UE supports uplink PDU set identification.

In a third aspect, alone or in combination with one or more of the first and second aspects, transmitting the signaling message via the one or more network layers comprises transmitting the signaling message via a service data application protocol layer.

In a fourth aspect, alone or in combination with one or more of the first through third aspects, transmitting the signaling message via the one or more network layers comprises transmitting the signaling message via a packet data convergence protocol layer.

In a fifth aspect, alone or in combination with one or more of the first through fourth aspects, transmitting the signaling message via the one or more network layers comprises transmitting the signaling message via a MAC layer.

In a sixth aspect, alone or in combination with one or more of the first through fifth aspects, transmitting the signaling message via the MAC layer comprises transmitting a MAC control element that includes a logical channel identifier and the information associated with the PDU set traffic.

In a seventh aspect, alone or in combination with one or more of the first through sixth aspects, transmitting the signaling message via the one or more network layers comprises transmitting the signaling message via UE assistance information, wherein the UE assistance information is associated with UE-level traffic, resource-block-level traffic, or flow-level traffic.

In an eighth aspect, alone or in combination with one or more of the first through seventh aspects, transmitting the signaling message via the one or more network layers comprises transmitting the signaling message via uplink control information, wherein the uplink control information is associated with UE-level traffic or physical uplink shared channel traffic.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
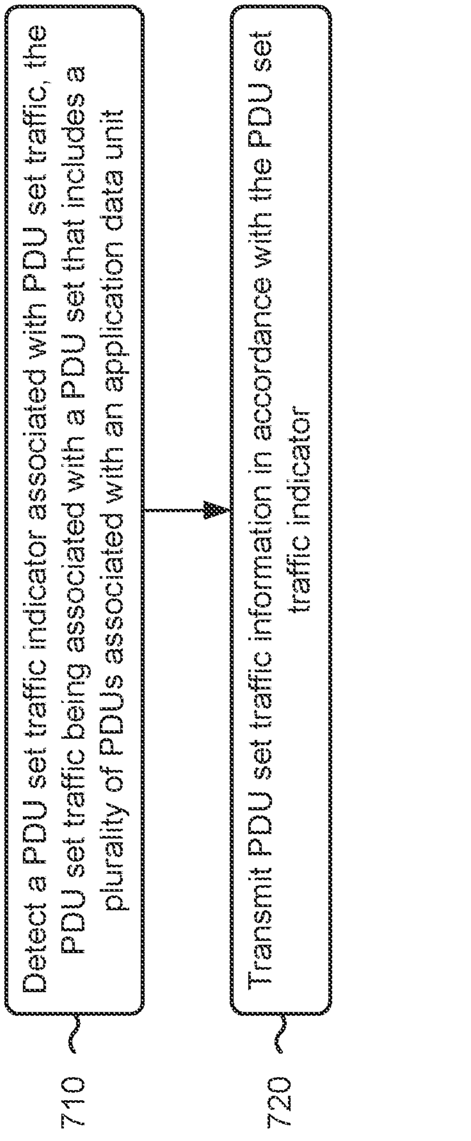
FIG. 7 is a diagram illustrating an example process performed, for example, at a UE or an apparatus of a UE, in accordance with the present disclosure.

FIG. 7 is a diagram illustrating an example process 700 performed, for example, at a UE or an apparatus of a UE, in accordance with the present disclosure. Example process 700 is an example where the apparatus or the UE (e.g., UE 120) performs operations associated with communicating PDU set traffic information.

As shown in FIG. 7, in some aspects, process 700 may include detecting a PDU set traffic indicator associated with PDU set traffic, the PDU set traffic being associated with a PDU set that includes a plurality of PDUs associated with an application data unit (block 710). For example, the UE (e.g., using communication manager 1006, depicted in FIG. 10) may detect a PDU set traffic indicator associated with PDU set traffic, the PDU set traffic being associated with a PDU set that includes a plurality of PDUs associated with an application data unit, as described above.

As further shown in FIG. 7, in some aspects, process 700 may include transmitting PDU set traffic information in accordance with the PDU set traffic indicator (block 720). For example, the UE (e.g., using transmission component 1004 and/or communication manager 1006, depicted in FIG. 10) may transmit PDU set traffic information in accordance with the PDU set traffic indicator, as described above.

Process 700 may include additional aspects, such as any single aspect or any combination of aspects described below and/or in connection with one or more other processes described elsewhere herein.

In a first aspect, detecting the PDU set traffic indicator comprises detecting that the PDU set traffic information is to be transmitted in accordance with an interval, and transmitting the PDU set traffic information in accordance with the PDU set traffic indicator comprises transmitting the PDU set traffic information in accordance with the interval.

In a second aspect, alone or in combination with the first aspect, detecting the PDU set traffic indicator comprises detecting an occurrence of an event associated with the PDU set traffic, and transmitting the PDU set traffic information in accordance with the PDU set traffic indicator comprises transmitting the PDU set traffic information after the occurrence of the event.

In a third aspect, alone or in combination with one or more of the first and second aspects, detecting the PDU set traffic indicator comprises detecting a presence of the PDU set traffic, and transmitting the PDU set traffic information in accordance with the PDU set traffic indicator comprises transmitting information that indicates at least one of the presence of the PDU set traffic, a start of the PDU set traffic, or an end of the PDU set traffic.

In a fourth aspect, alone or in combination with one or more of the first through third aspects, detecting the PDU set traffic indicator comprises detecting a movement of a network node configured to receive the PDU set traffic information, or detecting that a connection associated with the network node at a first time is different than a connection associated with the network node at a second time, wherein the first time corresponds to a transmission of a start indicator associated with the PDU set traffic and the second time corresponds to a time associated with transmitting the PDU set traffic information.

In a fifth aspect, alone or in combination with one or more of the first through fourth aspects, transmitting the PDU set traffic information comprises transmitting the PDU set traffic information in accordance with a handover associated with the network node, a change of a central unit associated with the network node, a change of a distributed unit associated with the network node, or a change of a user plane function associated with the network node.

In a sixth aspect, alone or in combination with one or more of the first through fifth aspects, transmitting the PDU set traffic information comprises transmitting uplink control information that includes the PDU set traffic information.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
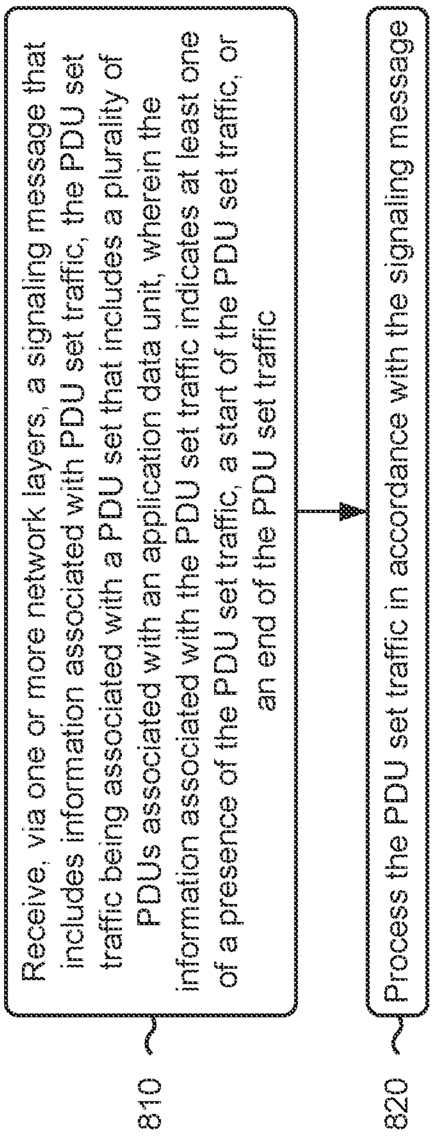
FIG. 8 is a diagram illustrating an example process performed, for example, at a network node or an apparatus of a network node, in accordance with the present disclosure.

FIG. 8 is a diagram illustrating an example process 800 performed, for example, at a network node or an apparatus of a network node, in accordance with the present disclosure. Example process 800 is an example where the apparatus or the network node (e.g., network node 110) performs operations associated with communicating PDU set traffic information.

As shown in FIG. 8, in some aspects, process 800 may include receiving, via one or more network layers, a signaling message that includes information associated with PDU set traffic, the PDU set traffic being associated with a PDU set that includes a plurality of PDUs associated with an application data unit, wherein the information associated with the PDU set traffic indicates at least one of a presence of the PDU set traffic, a start of the PDU set traffic, or an end of the PDU set traffic (block 810). For example, the network node (e.g., using reception component 1102 and/or communication manager 1106, depicted in FIG. 11) may receive, via one or more network layers, a signaling message that includes information associated with PDU set traffic, the PDU set traffic being associated with a PDU set that includes a plurality of PDUs associated with an application data unit, wherein the information associated with the PDU set traffic indicates at least one of a presence of the PDU set traffic, a start of the PDU set traffic, or an end of the PDU set traffic, as described above.

As further shown in FIG. 8, in some aspects, process 800 may include processing the PDU set traffic in accordance with the signaling message (block 820). For example, the network node (e.g., using communication manager 1106, depicted in FIG. 11) may process the PDU set traffic in accordance with the signaling message, as described above.

Process 800 may include additional aspects, such as any single aspect or any combination of aspects described below and/or in connection with one or more other processes described elsewhere herein.

In a first aspect, process 800 includes receiving capability information associated with the PDU set traffic.

In a second aspect, alone or in combination with the first aspect, receiving the capability information associated with the PDU set traffic comprises receiving an indication that a UE supports uplink PDU set identification.

In a third aspect, alone or in combination with one or more of the first and second aspects, process 800 includes identifying, by a core network function of the network node, the information associated with the PDU set traffic in accordance with combining a plurality of service data application protocol packets into the application data unit, providing, by the core network function of the network node to a radio access network function of the network node, PDU set level information for a quality of service flow, and identifying, by the radio access network function of the network node, a packet data convergence protocol resource block associated with the quality of service flow.

In a fourth aspect, alone or in combination with one or more of the first through third aspects, receiving the signaling message via the one or more network layers comprises receiving the signaling message via a service data application protocol layer.

In a fifth aspect, alone or in combination with one or more of the first through fourth aspects, receiving the signaling message via the one or more network layers comprises receiving the signaling message via a packet data convergence protocol layer.

In a sixth aspect, alone or in combination with one or more of the first through fifth aspects, receiving the signaling message via the one or more network layers comprises receiving the signaling message via a MAC layer.

In a seventh aspect, alone or in combination with one or more of the first through sixth aspects, receiving the signaling message via the MAC layer comprises receiving a MAC control element that includes a logical channel identifier and the information associated with the PDU set traffic.

In an eighth aspect, alone or in combination with one or more of the first through seventh aspects, receiving the signaling message via the one or more network layers comprises receiving the signaling message via UE assistance information, wherein the UE assistance information is associated with UE-level traffic, resource-block-level traffic, or flow-level traffic.

In a ninth aspect, alone or in combination with one or more of the first through eighth aspects, receiving the signaling message via the one or more network layers comprises receiving the signaling message via uplink control information, wherein the uplink control information is associated with user-equipment-level traffic or physical uplink shared channel traffic.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
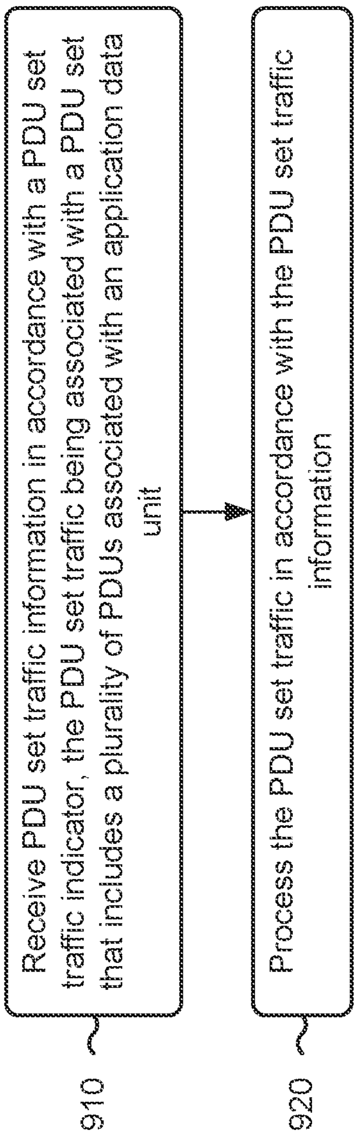
FIG. 9 is a diagram illustrating an example process performed, for example, at a network node or an apparatus of a network node, in accordance with the present disclosure.

FIG. 9 is a diagram illustrating an example process 900 performed, for example, at a network node or an apparatus of a network node, in accordance with the present disclosure. Example process 900 is an example where the apparatus or the network node (e.g., network node 110) performs operations associated with communicating PDU set traffic information.

As shown in FIG. 9, in some aspects, process 900 may include receiving PDU set traffic information in accordance with a PDU set traffic indicator, the PDU set traffic being associated with a PDU set that includes a plurality of PDUs associated with an application data unit (block 910). For example, the network node (e.g., using reception component 1102 and/or communication manager 1106, depicted in FIG. 11) may receive PDU set traffic information in accordance with a PDU set traffic indicator, the PDU set traffic being associated with a PDU set that includes a plurality of PDUs associated with an application data unit, as described above.

As further shown in FIG. 9, in some aspects, process 900 may include processing the PDU set traffic in accordance with the PDU set traffic information (block 920). For example, the network node (e.g., using communication manager 1106, depicted in FIG. 11) may process the PDU set traffic in accordance with the PDU set traffic information, as described above.

Process 900 may include additional aspects, such as any single aspect or any combination of aspects described below and/or in connection with one or more other processes described elsewhere herein.

In a first aspect, receiving the PDU set traffic information in accordance with the PDU set traffic indicator comprises receiving the PDU set traffic information in accordance with an interval.

In a second aspect, alone or in combination with the first aspect, receiving the PDU set traffic information in accordance with the PDU set traffic indicator comprises receiving the PDU set traffic information in accordance with an occurrence of an event.

In a third aspect, alone or in combination with one or more of the first and second aspects, receiving the PDU set traffic information in accordance with the PDU set traffic indicator comprises receiving information that indicates at least one of a presence of the PDU set traffic, a start of the PDU set traffic, or an end of the PDU set traffic.

In a fourth aspect, alone or in combination with one or more of the first through third aspects, the PDU set traffic indicator is associated with a movement of the network node, or a connection associated with the network node at a first time being different than a connection associated with the network node at a second time, wherein the first time corresponds to a reception of a start indicator associated with the PDU set traffic and the second time corresponds to a time associated with receiving the PDU set traffic information.

In a fifth aspect, alone or in combination with one or more of the first through fourth aspects, receiving the PDU set traffic information comprises receiving the PDU set traffic information in accordance with a handover associated with the network node, a change of a central unit associated with the network node, a change of a distributed unit associated with the network node, or a change of a user plane function associated with the network node.

In a sixth aspect, alone or in combination with one or more of the first through fifth aspects, receiving the PDU set traffic information comprises receiving uplink control information that includes the PDU set traffic information.

In a seventh aspect, alone or in combination with one or more of the first through sixth aspects, process 900 includes configuring a flow parameter, a resource block parameter, or a logical channel parameter in accordance with the PDU set traffic information.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
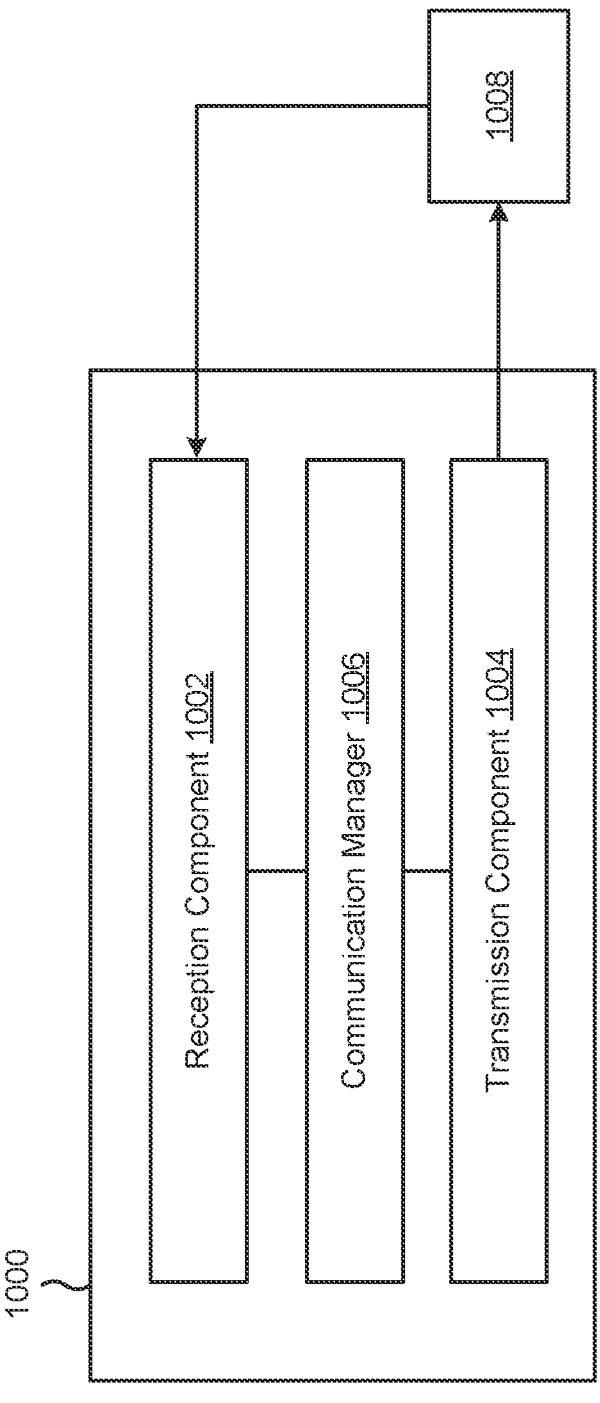
FIG. 10 is a diagram of an example apparatus for wireless communication, in accordance with the present disclosure.

FIG. 10 is a diagram of an example apparatus 1000 for wireless communication, in accordance with the present disclosure. The apparatus 1000 may be a UE, or a UE may include the apparatus 1000. In some aspects, the apparatus 1000 includes a reception component 1002, a transmission component 1004, and/or a communication manager 1006, which may be in communication with one another (for example, via one or more buses and/or one or more other components). In some aspects, the communication manager 1006 is the communication manager 140 described in connection with FIG. 1. As shown, the apparatus 1000 may communicate with another apparatus 1008, such as a UE or a network node (such as a CU, a DU, an RU, or a base station), using the reception component 1002 and the transmission component 1004.

In some aspects, the apparatus 1000 may be configured to perform one or more operations described herein in connection with FIG. 5. Additionally, or alternatively, the apparatus 1000 may be configured to perform one or more processes described herein, such as process 600 of FIG. 6, process 700 of FIG. 7, or a combination thereof. In some aspects, the apparatus 1000 and/or one or more components shown in FIG. 10 may include one or more components of the UE described in connection with FIG. 2. Additionally, or alternatively, one or more components shown in FIG. 10 may be implemented within one or more components described in connection with FIG. 2. Additionally, or alternatively, one or more components of the set of components may be implemented at least in part as software stored in one or more memories. For example, a component (or a portion of a component) may be implemented as instructions or code stored in a non-transitory computer-readable medium and executable by one or more controllers or one or more processors to perform the functions or operations of the component.

The reception component 1002 may receive communications, such as reference signals, control information, data communications, or a combination thereof, from the apparatus 1008. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1000. In some aspects, the reception component 1002 may include one or more antennas, one or more modems, one or more demodulators, one or more MIMO detectors, one or more receive processors, one or more controllers/processors, one or more memories, or a combination thereof, of the UE described in connection with FIG. 2.

The transmission component 1004 may transmit communications, such as reference signals, control information, data communications, or a combination thereof, to the apparatus 1008. In some aspects, one or more other components of the apparatus 1000 may generate communications and may provide the generated communications to the transmission component 1004 for transmission to the apparatus 1008. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1008. In some aspects, the transmission component 1004 may include one or more antennas, one or more modems, one or more modulators, one or more transmit MIMO processors, one or more transmit processors, one or more controllers/processors, one or more memories, or a combination thereof, of the UE described in connection with FIG. 2. In some aspects, the transmission component 1004 may be co-located with the reception component 1002 in one or more transceivers.

The communication manager 1006 may support operations of the reception component 1002 and/or the transmission component 1004. For example, the communication manager 1006 may receive information associated with configuring reception of communications by the reception component 1002 and/or transmission of communications by the transmission component 1004. Additionally, or alternatively, the communication manager 1006 may generate and/or provide control information to the reception component 1002 and/or the transmission component 1004 to control reception and/or transmission of communications.

The communication manager 1006 may generate a signaling message that includes information associated with PDU set traffic, the PDU set traffic being associated with a PDU set that includes a plurality of PDUs associated with an application data unit, wherein the information associated with the PDU set traffic indicates at least one of a presence of the PDU set traffic, a start of the PDU set traffic, or an end of the PDU set traffic. The transmission component 1004 may transmit the signaling message via one or more network layers. The transmission component 1004 may transmit capability information associated with the PDU set traffic.

The communication manager 1006 may detect a PDU set traffic indicator associated with PDU set traffic, the PDU set traffic being associated with a PDU set that includes a plurality of PDUs associated with an application data unit. The transmission component 1004 may transmit PDU set traffic information in accordance with the PDU set traffic indicator.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

Figure 11:
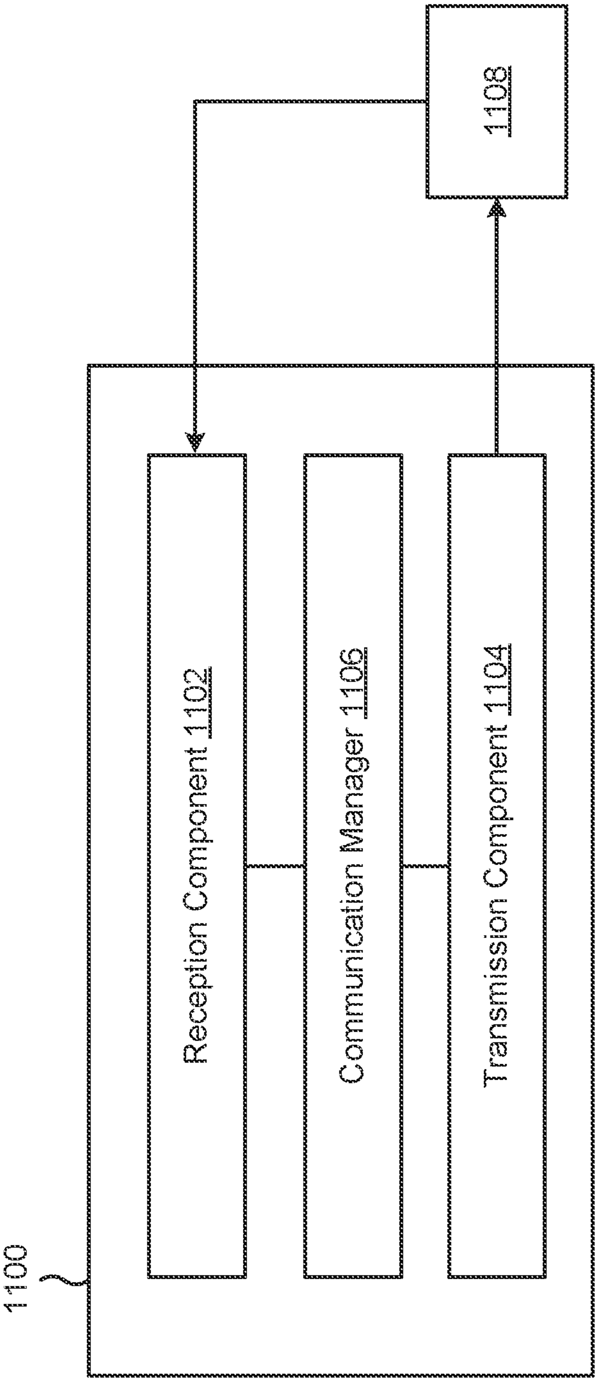
FIG. 11 is a diagram of an example apparatus for wireless communication, in accordance with the present disclosure.

FIG. 11 is a diagram of an example apparatus 1100 for wireless communication, in accordance with the present disclosure. The apparatus 1100 may be a network node, or a network node may include the apparatus 1100. In some aspects, the apparatus 1100 includes a reception component 1102, a transmission component 1104, and/or a communication manager 1106, which may be in communication with one another (for example, via one or more buses and/or one or more other components). In some aspects, the communication manager 1106 is the communication manager 150 described in connection with FIG. 1. As shown, the apparatus 1100 may communicate with another apparatus 1108, such as a UE or a network node (such as a CU, a DU, an RU, or a base station), using the reception component 1102 and the transmission component 1104.

In some aspects, the apparatus 1100 may be configured to perform one or more operations described herein in connection with FIG. 5. Additionally, or alternatively, the apparatus 1100 may be configured to perform one or more processes described herein, such as process 800 of FIG. 8, process 900 of FIG. 9, or a combination thereof. In some aspects, the apparatus 1100 and/or one or more components shown in FIG. 11 may include one or more components of the network node described in connection with FIG. 2. Additionally, or alternatively, one or more components shown in FIG. 11 may be implemented within one or more components described in connection with FIG. 2. Additionally, or alternatively, one or more components of the set of components may be implemented at least in part as software stored in one or more memories. For example, a component (or a portion of a component) may be implemented as instructions or code stored in a non-transitory computer-readable medium and executable by one or more controllers or one or more processors to perform the functions or operations of the component.

The reception component 1102 may receive communications, such as reference signals, control information, data communications, or a combination thereof, from the apparatus 1108. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1100. In some aspects, the reception component 1102 may include one or more antennas, one or more modems, one or more demodulators, one or more MIMO detectors, one or more receive processors, one or more controllers/processors, one or more memories, or a combination thereof, of the network node described in connection with FIG. 2. In some aspects, the reception component 1102 and/or the transmission component 1104 may include or may be included in a network interface. The network interface may be configured to obtain and/or output signals for the apparatus 1100 via one or more communications links, such as a backhaul link, a midhaul link, and/or a fronthaul link.

The transmission component 1104 may transmit communications, such as reference signals, control information, data communications, or a combination thereof, to the apparatus 1108. In some aspects, one or more other components of the apparatus 1100 may generate communications and may provide the generated communications to the transmission component 1104 for transmission to the apparatus 1108. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1108. In some aspects, the transmission component 1104 may include one or more antennas, one or more modems, one or more modulators, one or more transmit MIMO processors, one or more transmit processors, one or more controllers/processors, one or more memories, or a combination thereof, of the network node described in connection with FIG. 2. In some aspects, the transmission component 1104 may be co-located with the reception component 1102 in one or more transceivers.

The communication manager 1106 may support operations of the reception component 1102 and/or the transmission component 1104. For example, the communication manager 1106 may receive information associated with configuring reception of communications by the reception component 1102 and/or transmission of communications by the transmission component 1104. Additionally, or alternatively, the communication manager 1106 may generate and/or provide control information to the reception component 1102 and/or the transmission component 1104 to control reception and/or transmission of communications.

The reception component 1102 may receive, via one or more network layers, a signaling message that includes information associated with PDU set traffic, the PDU set traffic being associated with a PDU set that includes a plurality of PDUs associated with an application data unit, wherein the information associated with the PDU set traffic indicates at least one of a presence of the PDU set traffic, a start of the PDU set traffic, or an end of the PDU set traffic. The communication manager 1106 may process the PDU set traffic in accordance with the signaling message.

The reception component 1102 may receive capability information associated with the PDU set traffic. The communication manager 1106 may identify the information associated with the PDU set traffic in accordance with combining a plurality of service data application protocol packets into the application data unit. The communication manager 1106 may provide PDU set level information for a quality of service flow. The communication manager 1106 may identify a packet data convergence protocol resource block associated with the quality of service flow.

The reception component 1102 may receive PDU set traffic information in accordance with a PDU set traffic indicator, the PDU set traffic being associated with a PDU set that includes a plurality of PDUs associated with an application data unit. The communication manager 1106 may process the PDU set traffic in accordance with the PDU set traffic information. The communication manager 1106 may configure a flow parameter, a resource block parameter, or a logical channel parameter in accordance with the PDU set traffic information.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

The following provides an overview of some Aspects of the present disclosure:

Aspect 1: A method of wireless communication performed by a user equipment (UE), comprising: generating a signaling message that includes information associated with protocol data unit (PDU) set traffic, the PDU set traffic being associated with a PDU set that includes a plurality of PDUs associated with an application data unit, wherein the information associated with the PDU set traffic indicates at least one of a presence of the PDU set traffic, a start of the PDU set traffic, or an end of the PDU set traffic; and transmitting the signaling message via one or more network layers.

Aspect 2: The method of Aspect 1, further comprising transmitting capability information associated with the PDU set traffic.

Aspect 3: The method of Aspect 2, wherein transmitting the capability information associated with the PDU set traffic comprises transmitting an indication that the UE supports uplink PDU set identification.

Aspect 4: The method of any of Aspects 1-3, wherein transmitting the signaling message via the one or more network layers comprises transmitting the signaling message via a service data application protocol layer.

Aspect 5: The method of any of Aspects 1-4, wherein transmitting the signaling message via the one or more network layers comprises transmitting the signaling message via a packet data convergence protocol layer.

Aspect 6: The method of any of Aspects 1-5, wherein transmitting the signaling message via the one or more network layers comprises transmitting the signaling message via a medium access control (MAC) layer.

Aspect 7: The method of Aspect 6, wherein transmitting the signaling message via the MAC layer comprises transmitting a MAC control element that includes a logical channel identifier and the information associated with the PDU set traffic.

Aspect 8: The method of any of Aspects 1-7, wherein transmitting the signaling message via the one or more network layers comprises transmitting the signaling message via UE assistance information, wherein the UE assistance information is associated with UE-level traffic, resource-block-level traffic, or flow-level traffic.

Aspect 9: The method of any of Aspects 1-8, wherein transmitting the signaling message via the one or more network layers comprises transmitting the signaling message via uplink control information, wherein the uplink control information is associated with UE-level traffic or physical uplink shared channel traffic.

Aspect 10: A method of wireless communication performed by a user equipment (UE), comprising: detecting a protocol data unit (PDU) set traffic indicator associated with PDU set traffic, the PDU set traffic being associated with a PDU set that includes a plurality of PDUs associated with an application data unit; and transmitting PDU set traffic information in accordance with the PDU set traffic indicator.

Aspect 11: The method of Aspect 10, wherein detecting the PDU set traffic indicator comprises detecting that the PDU set traffic information is to be transmitted in accordance with an interval, and wherein transmitting the PDU set traffic information in accordance with the PDU set traffic indicator comprises transmitting the PDU set traffic information in accordance with the interval.

Aspect 12: The method of any of Aspects 10-11, wherein detecting the PDU set traffic indicator comprises detecting an occurrence of an event associated with the PDU set traffic, and wherein transmitting the PDU set traffic information in accordance with the PDU set traffic indicator comprises transmitting the PDU set traffic information after the occurrence of the event.

Aspect 13: The method of any of Aspects 10-12, wherein detecting the PDU set traffic indicator comprises detecting a presence of the PDU set traffic, and wherein transmitting the PDU set traffic information in accordance with the PDU set traffic indicator comprises transmitting information that indicates at least one of the presence of the PDU set traffic, a start of the PDU set traffic, or an end of the PDU set traffic.

Aspect 14: The method of any of Aspects 10-13, wherein detecting the PDU set traffic indicator comprises: detecting a movement of a network node configured to receive the PDU set traffic information; or detecting that a connection associated with the network node at a first time is different than a connection associated with the network node at a second time, wherein the first time corresponds to a transmission of a start indicator associated with the PDU set traffic and the second time corresponds to a time associated with transmitting the PDU set traffic information.

Aspect 15: The method of Aspect 14, wherein transmitting the PDU set traffic information comprises transmitting the PDU set traffic information in accordance with a handover associated with the network node, a change of a central unit associated with the network node, a change of a distributed unit associated with the network node, or a change of a user plane function associated with the network node.

Aspect 16: The method of any of Aspects 10-15, wherein transmitting the PDU set traffic information comprises transmitting uplink control information that includes the PDU set traffic information.

Aspect 17: A method of wireless communication performed by a network node, comprising: receiving, via one or more network layers, a signaling message that includes information associated with protocol data unit (PDU) set traffic, the PDU set traffic being associated with a PDU set that includes a plurality of PDUs associated with an application data unit, wherein the information associated with the PDU set traffic indicates at least one of a presence of the PDU set traffic, a start of the PDU set traffic, or an end of the PDU set traffic; and processing the PDU set traffic in accordance with the signaling message.

Aspect 18: The method of Aspect 17, further comprising receiving capability information associated with the PDU set traffic.

Aspect 19: The method of Aspect 18, wherein receiving the capability information associated with the PDU set traffic comprises receiving an indication that a user equipment supports uplink PDU set identification.

Aspect 20: The method of any of Aspects 17-19, further comprising: identifying, by a core network function of the network node, the information associated with the PDU set traffic in accordance with combining a plurality of service data application protocol packets into the application data unit; providing, by the core network function of the network node to a radio access network function of the network node, PDU set level information for a quality of service flow; and identifying, by the radio access network function of the network node, a packet data convergence protocol resource block associated with the quality of service flow.

Aspect 21: The method of any of Aspects 17-20, wherein receiving the signaling message via the one or more network layers comprises receiving the signaling message via a service data application protocol layer.

Aspect 22: The method of any of Aspects 17-21, wherein receiving the signaling message via the one or more network layers comprises receiving the signaling message via a packet data convergence protocol layer.

Aspect 23: The method of any of Aspects 17-22, wherein receiving the signaling message via the one or more network layers comprises receiving the signaling message via a medium access control (MAC) layer.

Aspect 24: The method of Aspect 23, wherein receiving the signaling message via the MAC layer comprises receiving a MAC control element that includes a logical channel identifier and the information associated with the PDU set traffic.

Aspect 25: The method of any of Aspects 17-24, wherein receiving the signaling message via the one or more network layers comprises receiving the signaling message via user equipment (UE) assistance information, wherein the UE assistance information is associated with UE-level traffic, resource-block-level traffic, or flow-level traffic.

Aspect 26: The method of any of Aspects 17-25, wherein receiving the signaling message via the one or more network layers comprises receiving the signaling message via uplink control information, wherein the uplink control information is associated with user-equipment-level traffic or physical uplink shared channel traffic.

Aspect 27: A method of wireless communication performed by a network node, comprising: receiving protocol data unit (PDU) set traffic information in accordance with a PDU set traffic indicator, the PDU set traffic being associated with a PDU set that includes a plurality of PDUs associated with an application data unit; and processing the PDU set traffic in accordance with the PDU set traffic information.

Aspect 28: The method of Aspect 27, wherein receiving the PDU set traffic information in accordance with the PDU set traffic indicator comprises receiving the PDU set traffic information in accordance with an interval.

Aspect 29: The method of any of Aspects 27-28, wherein receiving the PDU set traffic information in accordance with the PDU set traffic indicator comprises receiving the PDU set traffic information in accordance with an occurrence of an event.

Aspect 30: The method of any of Aspects 27-29, wherein receiving the PDU set traffic information in accordance with the PDU set traffic indicator comprises receiving information that indicates at least one of a presence of the PDU set traffic, a start of the PDU set traffic, or an end of the PDU set traffic.

Aspect 31: The method of any of Aspects 27-30, wherein the PDU set traffic indicator is associated with: a movement of the network node; or a connection associated with the network node at a first time being different than a connection associated with the network node at a second time, wherein the first time corresponds to a reception of a start indicator associated with the PDU set traffic and the second time corresponds to a time associated with receiving the PDU set traffic information.

Aspect 32: The method of Aspect 31, wherein receiving the PDU set traffic information comprises receiving the PDU set traffic information in accordance with a handover associated with the network node, a change of a central unit associated with the network node, a change of a distributed unit associated with the network node, or a change of a user plane function associated with the network node.

Aspect 33: The method of any of Aspects 27-32, wherein receiving the PDU set traffic information comprises receiving uplink control information that includes the PDU set traffic information.

Aspect 34: The method of any of Aspects 27-33, further comprising configuring a flow parameter, a resource block parameter, or a logical channel parameter in accordance with the PDU set traffic information.

Aspect 35: The method of any of Aspects 27-34, further comprising transmitting, in accordance with a PDU set presence indication, an allocation for the PDU set traffic on one or more link in accordance with one or more QoS requirements.

Aspect 36: An apparatus for wireless communication at a device, the apparatus comprising one or more processors; one or more memories coupled with the one or more processors; and instructions stored in the one or more memories and executable by the one or more processors to cause the apparatus to perform the method of one or more of Aspects 1-35.

Aspect 37: An apparatus for wireless communication at a device, the apparatus comprising one or more memories and one or more processors coupled to the one or more memories, the one or more processors configured to cause the device to perform the method of one or more of Aspects 1-35.

Aspect 38: An apparatus for wireless communication, the apparatus comprising at least one means for performing the method of one or more of Aspects 1-35.

Aspect 39: A non-transitory computer-readable medium storing code for wireless communication, the code comprising instructions executable by one or more processors to perform the method of one or more of Aspects 1-35.

Aspect 40: A non-transitory computer-readable medium storing a set of instructions for wireless communication, the set of instructions comprising one or more instructions that, when executed by one or more processors of a device, cause the device to perform the method of one or more of Aspects 1-35.

Aspect 41: A device for wireless communication, the device comprising a processing system that includes one or more processors and one or more memories coupled with the one or more processors, the processing system configured to cause the device to perform the method of one or more of Aspects 1-35.

Aspect 42: An apparatus for wireless communication at a device, the apparatus comprising one or more memories and one or more processors coupled to the one or more memories, the one or more processors individually or collectively configured to cause the device to perform the method of one or more of Aspects 1-35.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or any conventional processor, controller, microcontroller, or state machine. A processor also may be implemented as a combination of computing devices, for example, a combination of a DSP and a microprocessor, a plurality of microprocessors, one or more microprocessors in conjunction with a DSP core, or any other such configuration. In some aspects, particular processes and methods may be performed by circuitry that is specific to a given function.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at a user equipment (UE), comprising:

one or more memories; and one or more processors, coupled to the one or more memories, configured to cause the UE to:

generate a signaling message that includes information associated with protocol data unit (PDU) set traffic, the PDU set traffic being associated with a PDU set that includes a plurality of PDUs associated with an application data unit, wherein the information associated with the PDU set traffic indicates at least one of a presence of the PDU set traffic, a start of the PDU set traffic, or an end of the PDU set traffic; and transmit, via UE assistance information or uplink control information, the signaling message via one or more network layers, wherein the UE assistance information being associated with UE-level traffic, resource-block-level traffic, or flow-level traffic, and wherein the uplink control information is associated with UE-level traffic or physical uplink shared channel traffic.

2. The apparatus of claim 1, wherein the one or more processors are further configured to cause the UE to transmit capability information associated with the PDU set traffic.

3. The apparatus of claim 2, wherein the one or more processors, to cause the UE to transmit the capability information associated with the PDU set traffic, are configured to cause the UE to transmit an indication that the UE supports uplink PDU set identification.

4. The apparatus of claim 1, wherein the one or more processors, to cause the UE to transmit the signaling message via the one or more network layers, are configured to cause the UE to transmit the signaling message via a service data application protocol layer.

5. The apparatus of claim 1, wherein the one or more processors, to cause the UE to transmit the signaling message via the one or more network layers, are configured to cause the UE to transmit the signaling message via a packet data convergence protocol layer.

6. The apparatus of claim 1, wherein the one or more processors, to cause the UE to transmit the signaling message via the one or more network layers, are configured to cause the UE to transmit the signaling message via a medium access control (MAC) layer.

7. The apparatus of claim 6, wherein the one or more processors, to cause the UE to transmit the signaling message via the MAC layer, are configured to cause the UE to transmit a logical channel identifier and the information associated with the PDU set traffic.

8. An apparatus for wireless communication at a user equipment (UE), comprising:

one or more memories; and one or more processors, coupled to the one or more memories, configured to cause the UE to:

detect a protocol data unit (PDU) set traffic indicator associated with PDU set traffic, the PDU set traffic being associated with a PDU set that includes a plurality of PDUs associated with an application data unit, wherein the one or more processors, to cause the UE to detect the PDU set traffic indicator, are configured to cause the UE to:

detect a movement of a network node configured to receive PDU set traffic information; or detect that a connection associated with the network node at a first time is different than a connection associated with the network node at a second time, wherein the first time corresponds to a transmission of a start indicator associated with the PDU set traffic and the second time corresponds to a time associated with transmitting the PDU set traffic information; and transmit the PDU set traffic information in accordance with the PDU set traffic indicator.

9. The apparatus of claim 8, wherein the one or more processors, to cause the UE to transmit the PDU set traffic information in accordance with the PDU set traffic indicator, are configured to cause the UE to transmit the PDU set traffic information in accordance with.

10. The apparatus of claim 8, wherein the one or more processors, to cause the UE to transmit the PDU set traffic information in accordance with the PDU set traffic indicator, are configured to cause the UE to transmit the PDU set traffic information after an occurrence of an event associated with the PDU set traffic.

11. The apparatus of claim 8, wherein the one or more processors, to cause the UE to transmit the PDU set traffic information in accordance with the PDU set traffic indicator, are configured to cause the UE to transmit information that indicates a presence of the PDU set traffic.

12. The apparatus of claim 8, wherein the one or more processors, to cause the UE to transmit the PDU set traffic information, are configured to cause the UE to transmit the PDU set traffic information in accordance with a handover associated with the network node.

13. An apparatus for wireless communication at a network node, comprising:

one or more memories; and one or more processors, coupled to the one or more memories, configured to cause the network node to:

receive, via one or more network layers, a signaling message that includes information associated with protocol data unit (PDU) set traffic, the PDU set traffic being associated with a PDU set that includes a plurality of PDUs associated with an application data unit, wherein the information associated with the PDU set traffic indicates at least one of a presence of the PDU set traffic, a start of the PDU set traffic, or an end of the PDU set traffic;

identify the information associated with the PDU set traffic in accordance with combining a plurality of service data application protocol packets into the application data unit;

provide PDU set level information for a quality of service flow;

identify a packet data convergence protocol resource block associated with the quality of service flow; and process the PDU set traffic in accordance with the signaling message.

14. The apparatus of claim 13, wherein the one or more processors are further configured to cause the network node to receive capability information associated with the PDU set traffic.

15. The apparatus of claim 14, wherein the one or more processors, to cause the network node to receive the capability information associated with the PDU set traffic, are configured to cause the network node to receive an indication that a user equipment supports uplink PDU set identification.

16. The apparatus of claim 13, wherein the one or more processors, to cause the network node to receive the signaling message via the one or more network layers, are configured to cause the network node to receive the signaling message via a service data application protocol layer.

17. The apparatus of claim 13, wherein the one or more processors, to cause the network node to receive the signaling message via the one or more network layers, are configured to cause the network node to receive the signaling message via a packet data convergence protocol layer.

18. The apparatus of claim 13, wherein the one or more processors, to cause the network node to receive the signaling message via the one or more network layers, are configured to cause the network node to receive the signaling message via a medium access control (MAC) layer.

19. The apparatus of claim 18, wherein the one or more processors, to cause the network node to receive the signaling message via the MAC layer, are configured to cause the network node to receive a MAC control element that includes a logical channel identifier and the information associated with the PDU set traffic.

20. The apparatus of claim 13, wherein the one or more processors, to cause the network node to receive the signaling message via the one or more network layers, are configured to cause the network node to:

receive the signaling message via user equipment (UE) assistance information, wherein the UE assistance information is associated with UE-level traffic, resource-block-level traffic, or flow-level traffic; or receive the signaling message via uplink control information, wherein the uplink control information is associated with user-equipment-level traffic or physical uplink shared channel traffic.

21. An apparatus for wireless communication at a network node, comprising:

one or more memories; and one or more processors, coupled to the one or more memories, configured to cause the network node to:

receive protocol data unit (PDU) set traffic information, the PDU set traffic information in accordance with a PDU set traffic indicator associated with PDU set traffic, the PDU set traffic being associated with a PDU set that includes a plurality of PDUs associated with an application data unit, and the PDU set traffic indicator being associated with:

a movement of the network node; or a connection associated with the network node at a first time being different than a connection associated with the network node at a second time, wherein the first time corresponds to a reception of a start indicator associated with the PDU set traffic and the second time corresponds to a time associated with receiving the PDU set traffic information; and process the PDU set traffic in accordance with the PDU set traffic information.

22. The apparatus of claim 21, wherein the one or more processors, to cause the network node to receive the PDU set traffic information in accordance with the PDU set traffic indicator, are configured to cause the network node to receive the PDU set traffic information in accordance with an interval.

23. The apparatus of claim 21, wherein the one or more processors, to cause the network node to receive the PDU set traffic information in accordance with the PDU set traffic indicator, are configured to cause the network node to receive the PDU set traffic information in accordance with an occurrence of an event.

24. The apparatus of claim 21, wherein the one or more processors, to cause the network node to receive the PDU set traffic information in accordance with the PDU set traffic indicator, are configured to cause the network node to receive information that indicates at least one of a presence of the PDU set traffic, a start of the PDU set traffic, or an end of the PDU set traffic.

25. The apparatus of claim 21, wherein the one or more processors, to cause the network node to receive the PDU set traffic information, are configured to cause the network node to receive the PDU set traffic information in accordance with a handover associated with the network node, a change of a central unit associated with the network node, a change of a distributed unit associated with the network node, or a change of a user plane function associated with the network node.

26. The apparatus of claim 8, wherein the one or more processors, to cause the UE to transmit the PDU set traffic information in accordance with the PDU set traffic indicator, are configured to cause the UE to transmit information that indicates a start of the PDU set traffic.

27. The apparatus of claim 8, wherein the one or more processors, to cause the UE to transmit the PDU set traffic information in accordance with the PDU set traffic indicator, are configured to cause the UE to transmit information that indicates an end of the PDU set traffic.

28. The apparatus of claim 8, wherein the one or more processors, to cause the UE to transmit the PDU set traffic information, are configured to cause the UE to transmit the PDU set traffic information in accordance with a change of a central unit associated with the network node.

29. The apparatus of claim 8, wherein the one or more processors, to cause the UE to transmit the PDU set traffic information, are configured to cause the UE to transmit the PDU set traffic information in accordance with a change of a distributed unit associated with the network node.

30. The apparatus of claim 8, wherein the one or more processors, to cause the UE to transmit the PDU set traffic information, are configured to cause the UE to transmit the PDU set traffic information in accordance with a change of a user plane function associated with the network node.

* * * * *